United States Patent [19]
Sato

[11] Patent Number: 5,956,184
[45] Date of Patent: Sep. 21, 1999

[54] ZOOM LENS SYSTEM HAVING HIGH ZOOM RATIO

[75] Inventor: Haruo Sato, Kawaguchi, Japan

[73] Assignee: Nikon Corporation, Tokyo, Japan

[21] Appl. No.: 08/922,916

[22] Filed: Sep. 3, 1997

[30] Foreign Application Priority Data

Sep. 4, 1996 [JP] Japan .................................. 8-234172

[51] Int. Cl.⁶ .............................................. G02B 15/14
[52] U.S. Cl. ......................................... 359/683; 359/695
[58] Field of Search .................................. 359/683, 695, 359/691

[56] References Cited

U.S. PATENT DOCUMENTS

| | | | |
|---|---|---|---|
| 4,896,950 | 1/1990 | Endo et al. | 359/683 |
| 5,189,557 | 2/1993 | Endo et al. | 359/683 |
| 5,388,004 | 2/1995 | Adachi | 359/683 |
| 5,526,186 | 6/1996 | Sekine | 359/683 |
| 5,528,427 | 6/1996 | Tanaka et al. | 359/683 |

FOREIGN PATENT DOCUMENTS

| | | |
|---|---|---|
| 57-2014 | 1/1982 | Japan . |
| 57-154205 | 9/1982 | Japan . |
| 57-164709 | 10/1982 | Japan . |
| 57-164710 | 10/1982 | Japan . |
| 58-202416 | 11/1983 | Japan . |
| 58-211117 | 12/1983 | Japan . |
| 58-211118 | 12/1983 | Japan . |
| 60-39623 | 3/1985 | Japan . |
| 61-258219 | 11/1986 | Japan . |
| 63-205628 | 8/1988 | Japan . |
| 63-205629 | 8/1988 | Japan . |
| 63-266415 | 11/1988 | Japan . |
| 1-10207 | 1/1989 | Japan . |
| 1-154014 | 6/1989 | Japan . |
| 1-191819 | 8/1989 | Japan . |
| 4-146407 | 5/1992 | Japan . |
| 4-186211 | 7/1992 | Japan . |
| 4-186212 | 7/1992 | Japan . |
| 4-186213 | 7/1992 | Japan . |
| 5-119260 | 5/1993 | Japan . |
| 6-230285 | 8/1994 | Japan . |
| 7-151970 | 6/1995 | Japan . |

Primary Examiner—Georgia Epps
Assistant Examiner—Suzanne Letendre
Attorney, Agent, or Firm—Michael N. Meller

[57] ABSTRACT

Zoom lens system having a high zoom ratio including, in order from the object end: a first lens group having a positive refractive power; a second lens group having a negative refractive power; a third lens group having a positive refractive power; a fourth lens group having a negative refractive power; and a fifth lens group having a positive refractive power. When the zoom lens system is operated from its maximum wide-angle state to its maximum telephoto state, the air-space separation between the first lens group and the second lens group is increased, the air-space separation between the second lens group and the third lens group is decreased, the air-space separation between the third lens group and the fourth lens group is increased, and the air-space separation between the fourth lens group and the fifth lens group is decreased, and the following condition (1) is satisfied:

$$2.3 < D_{IT} - D_{IW}/fw < 10 \qquad (1)$$

where $D_{IT}$ is the separation between the first lens group and the second lens group in the maximum telephoto state, $D_{IW}$ is the separation between the first lens group and the second lens group in the maximum wide-angle state, and fw is the focal length of the total zoom lens system in the maximum wide-angle state.

33 Claims, 30 Drawing Sheets

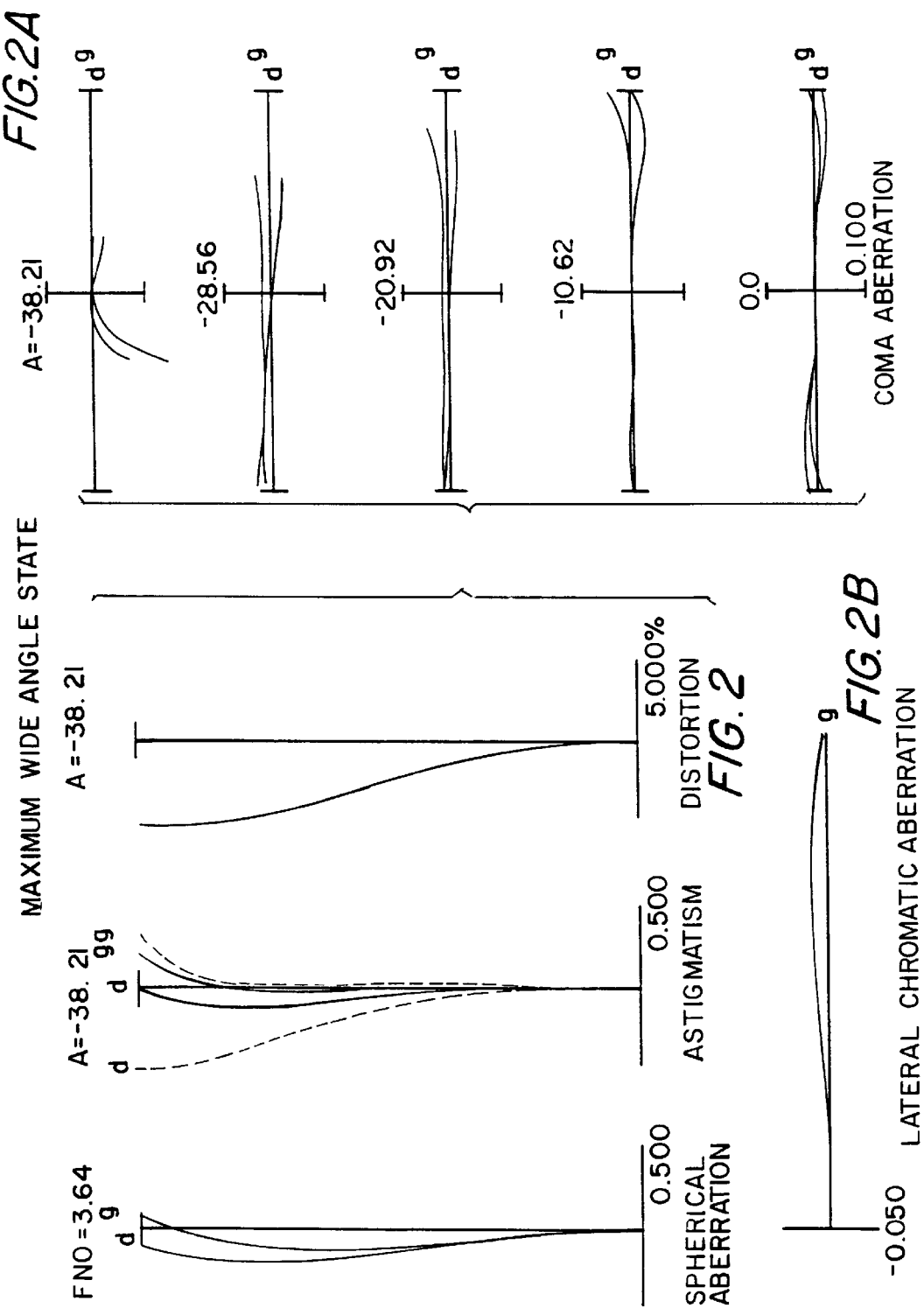

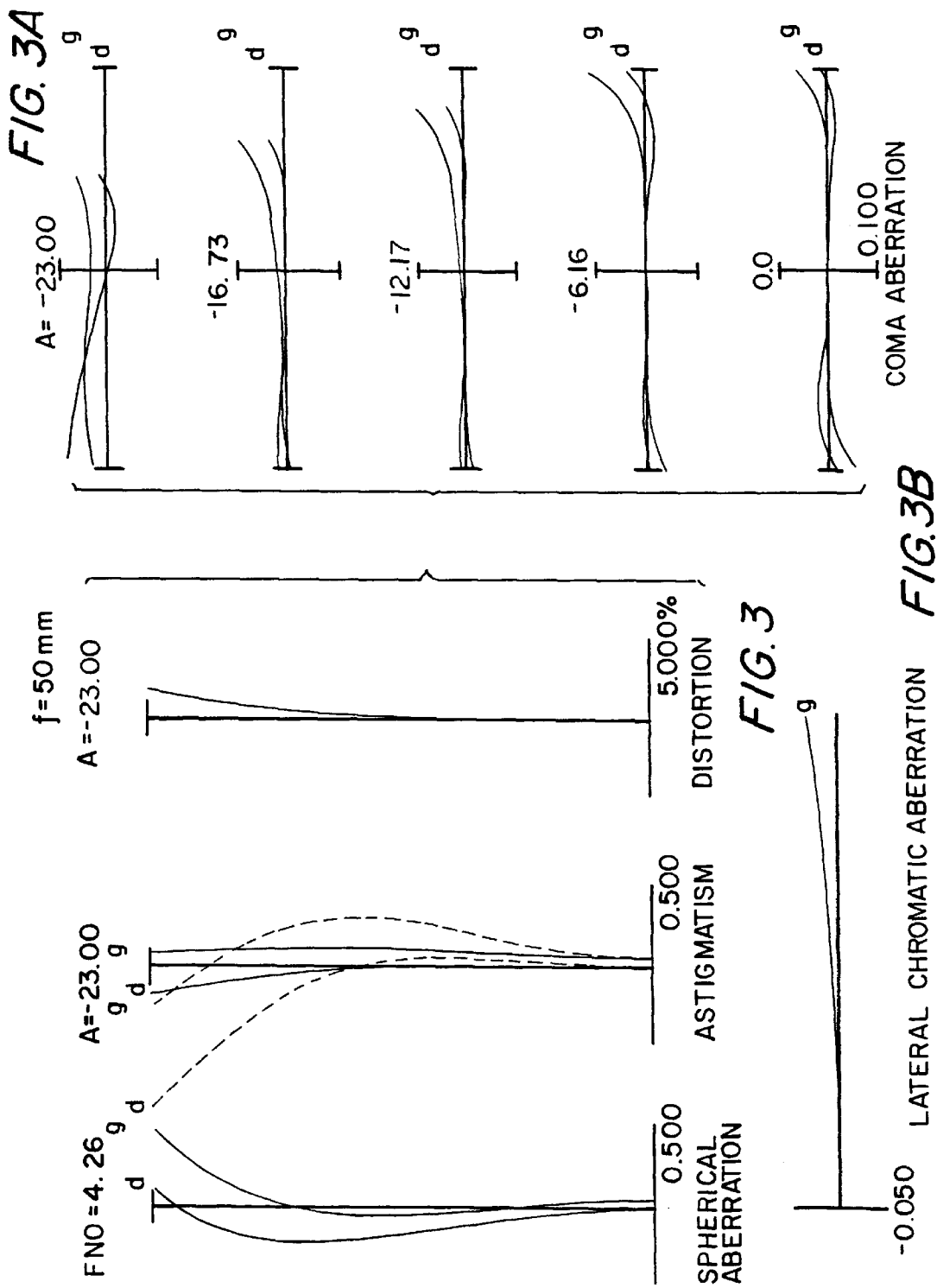

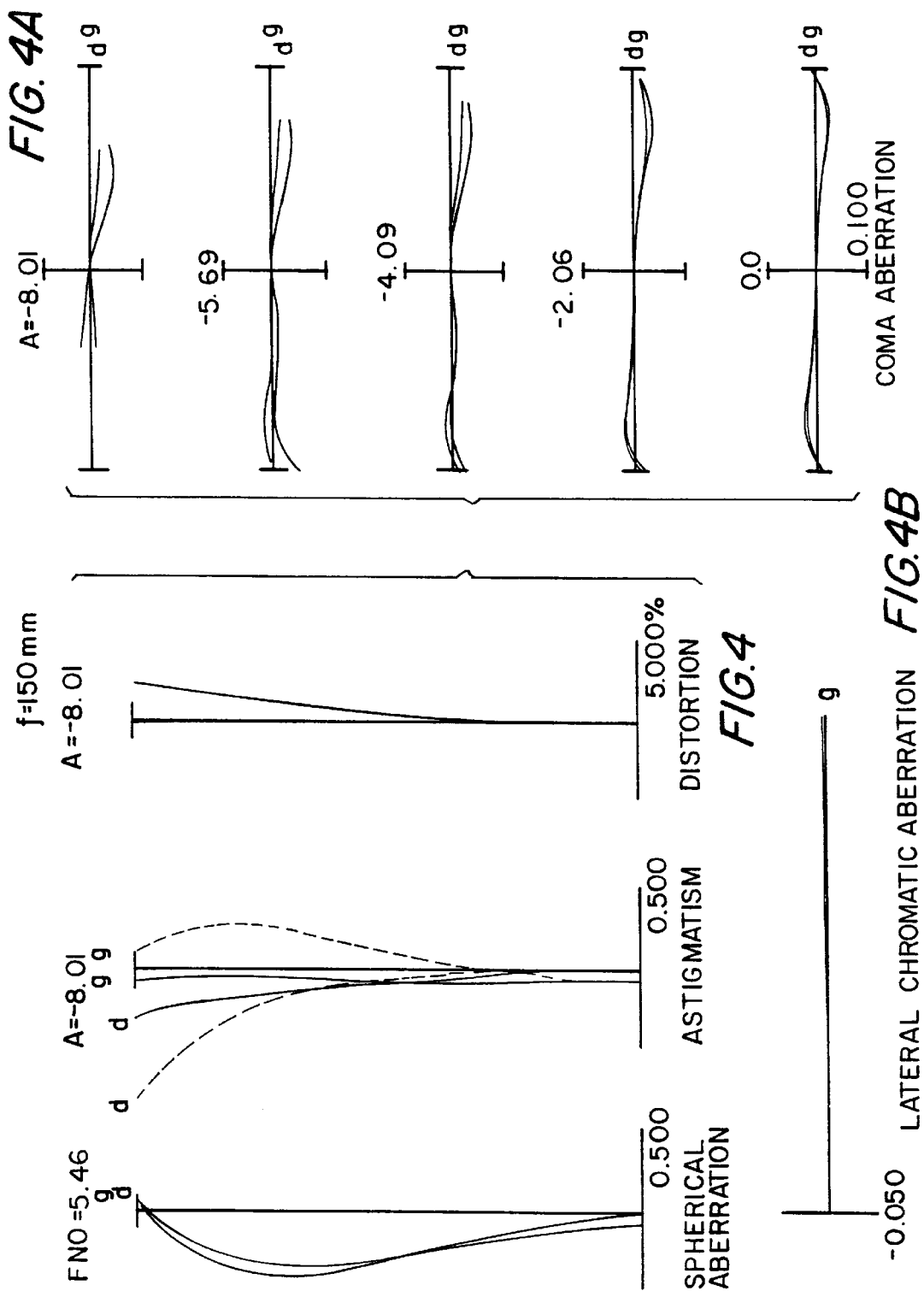

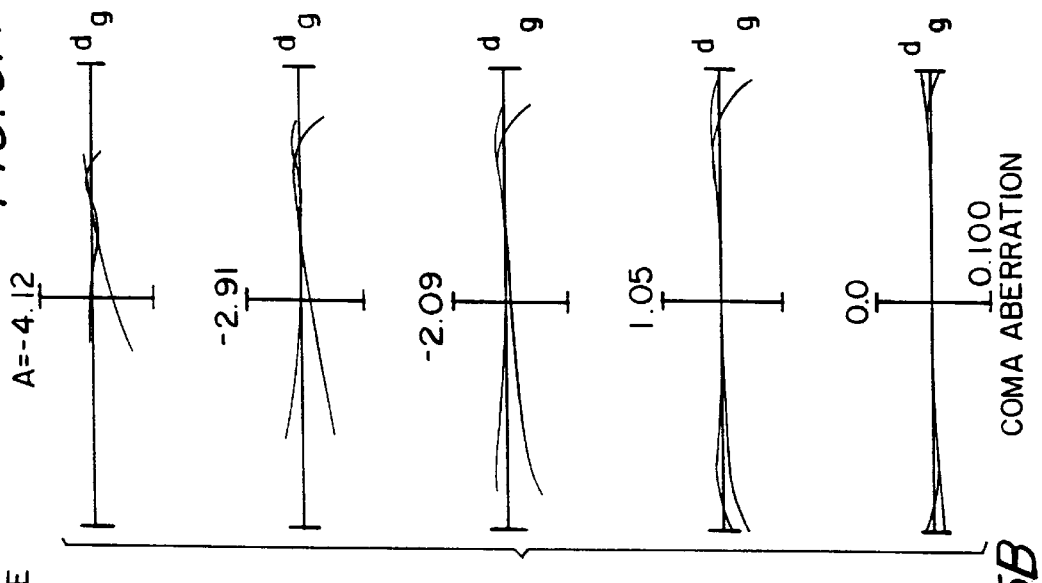
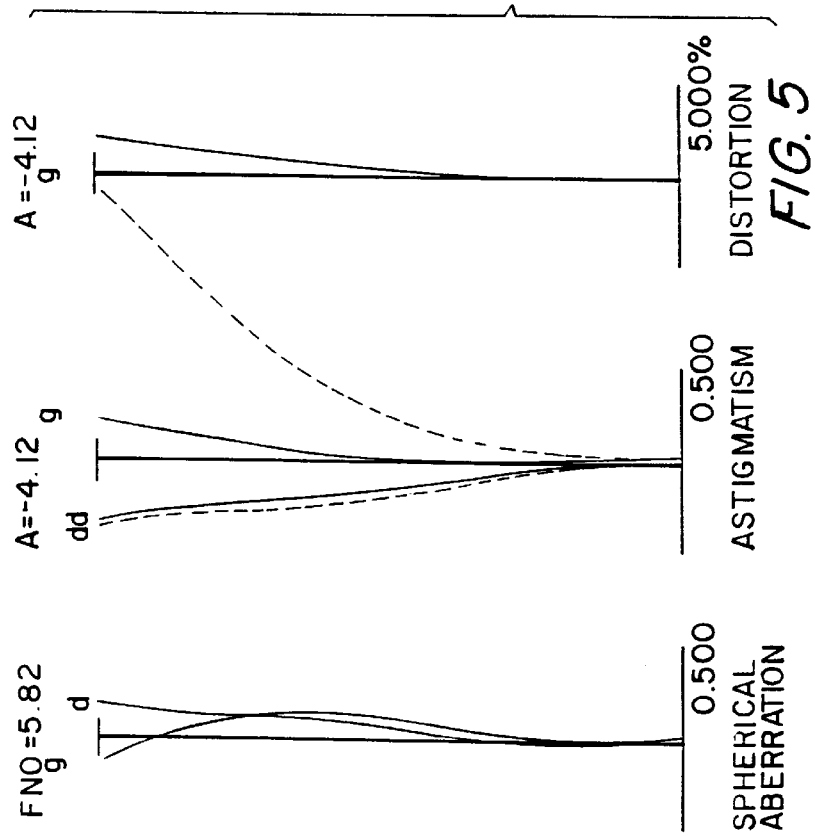
FIG. 5A
FIG. 5B
FIG. 5
MAXIMUM TELEPHOTO STATE

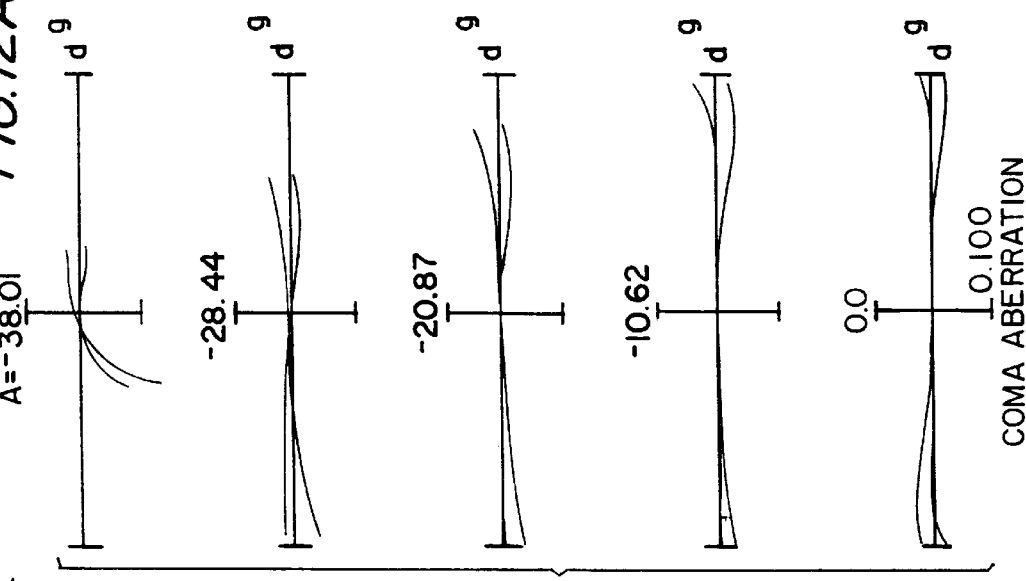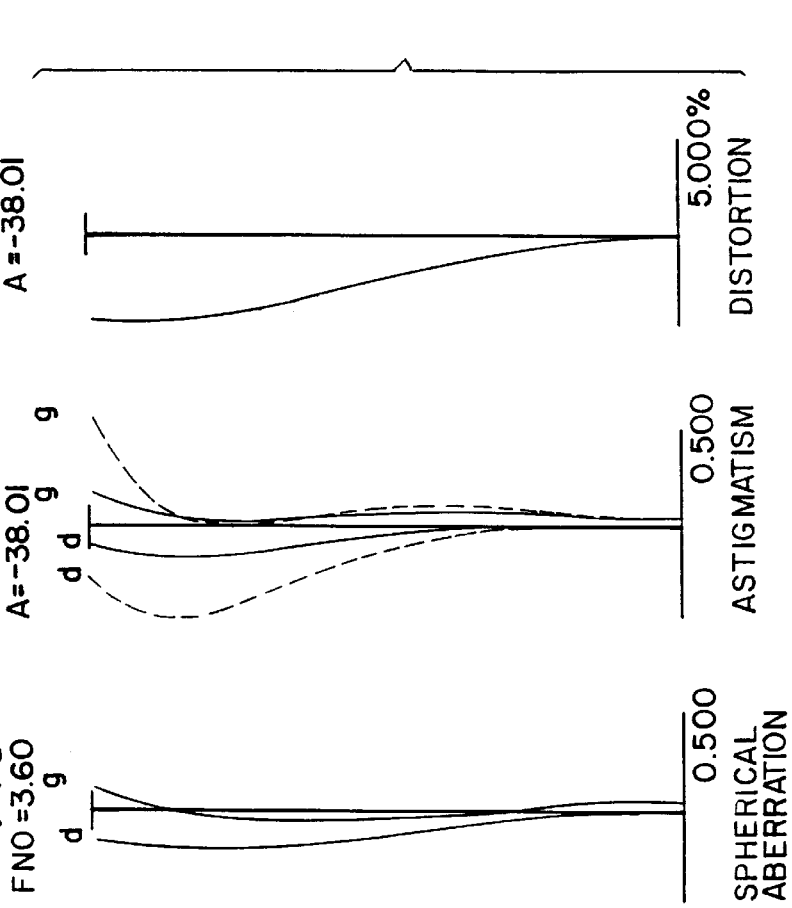

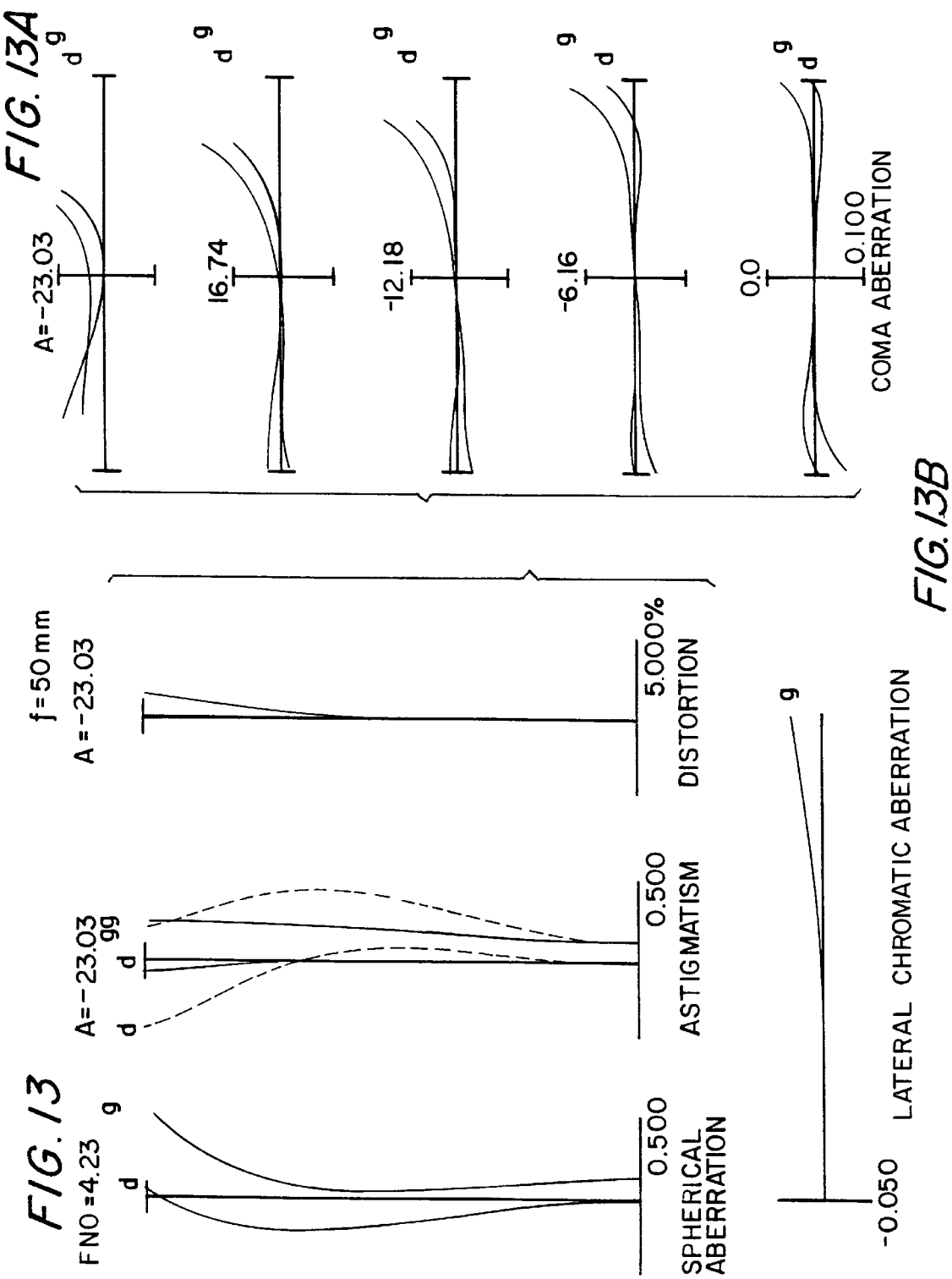

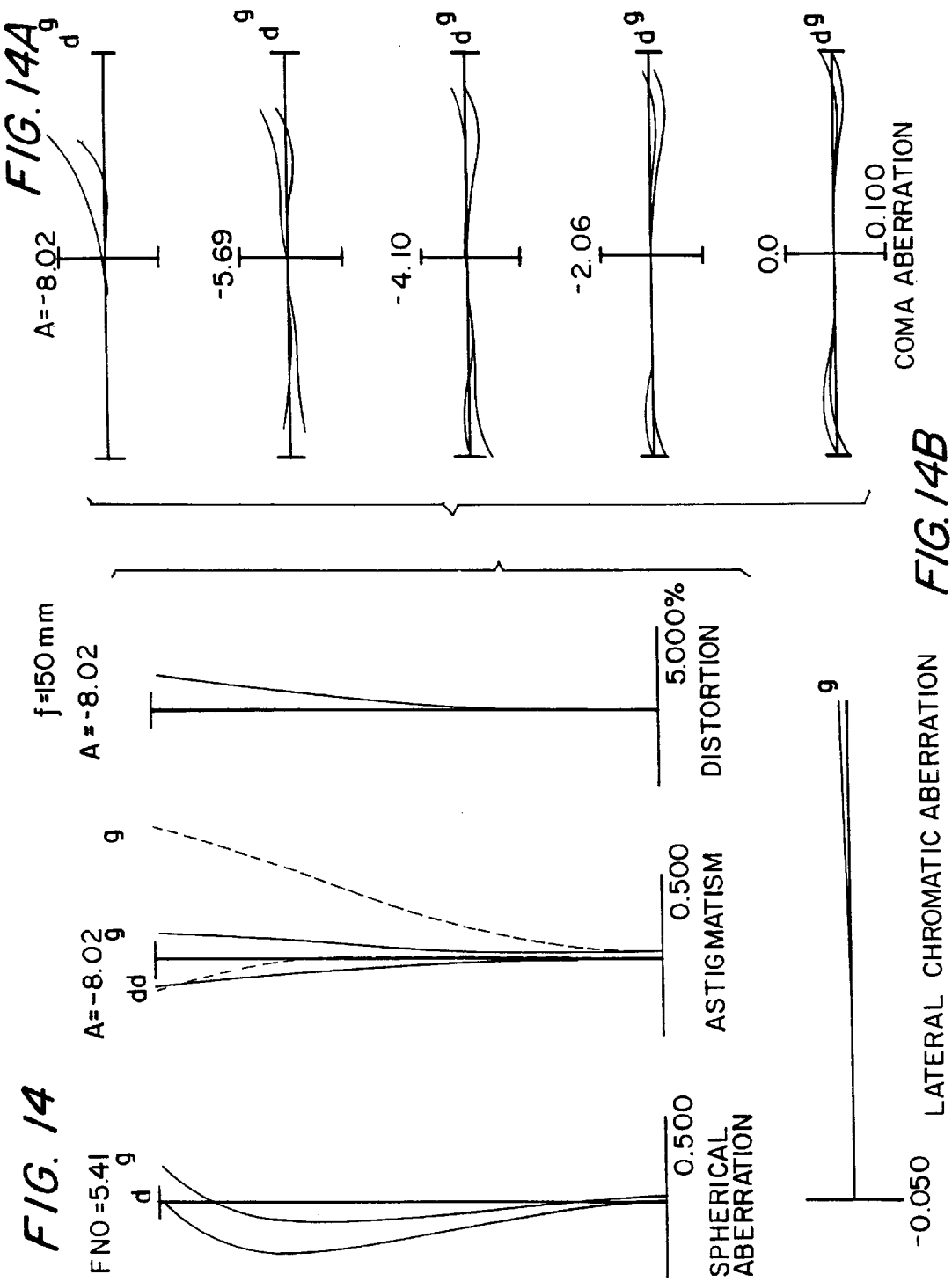

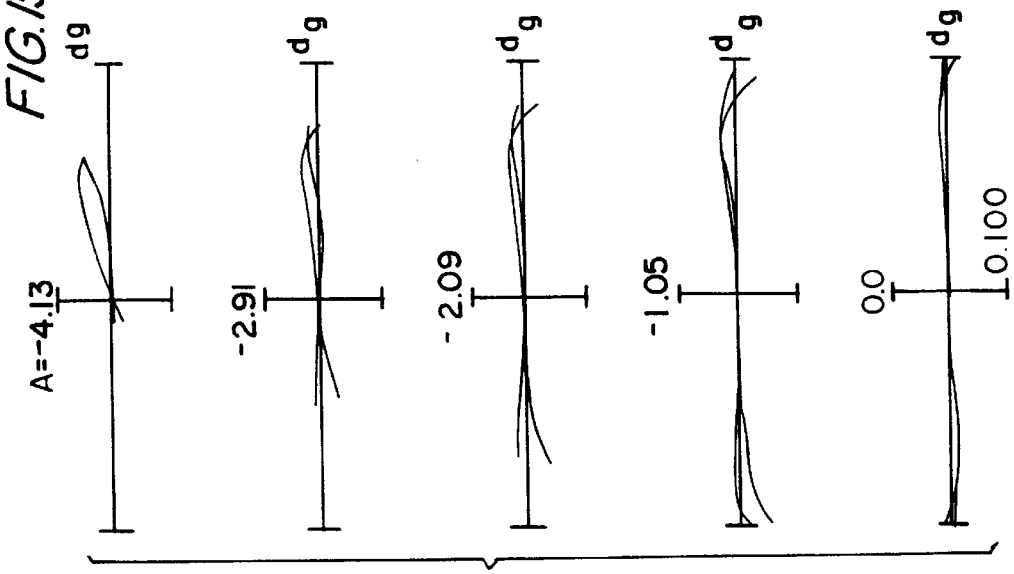
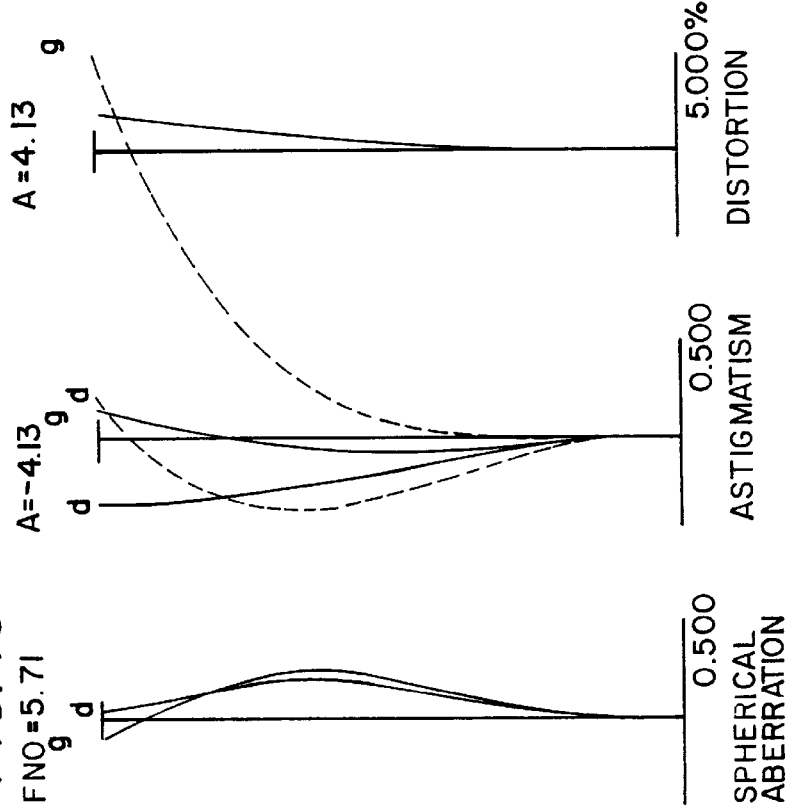
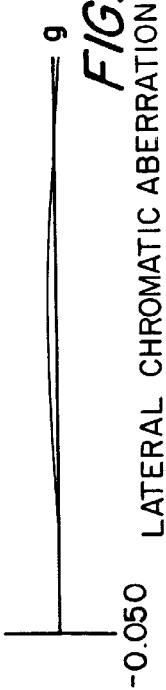

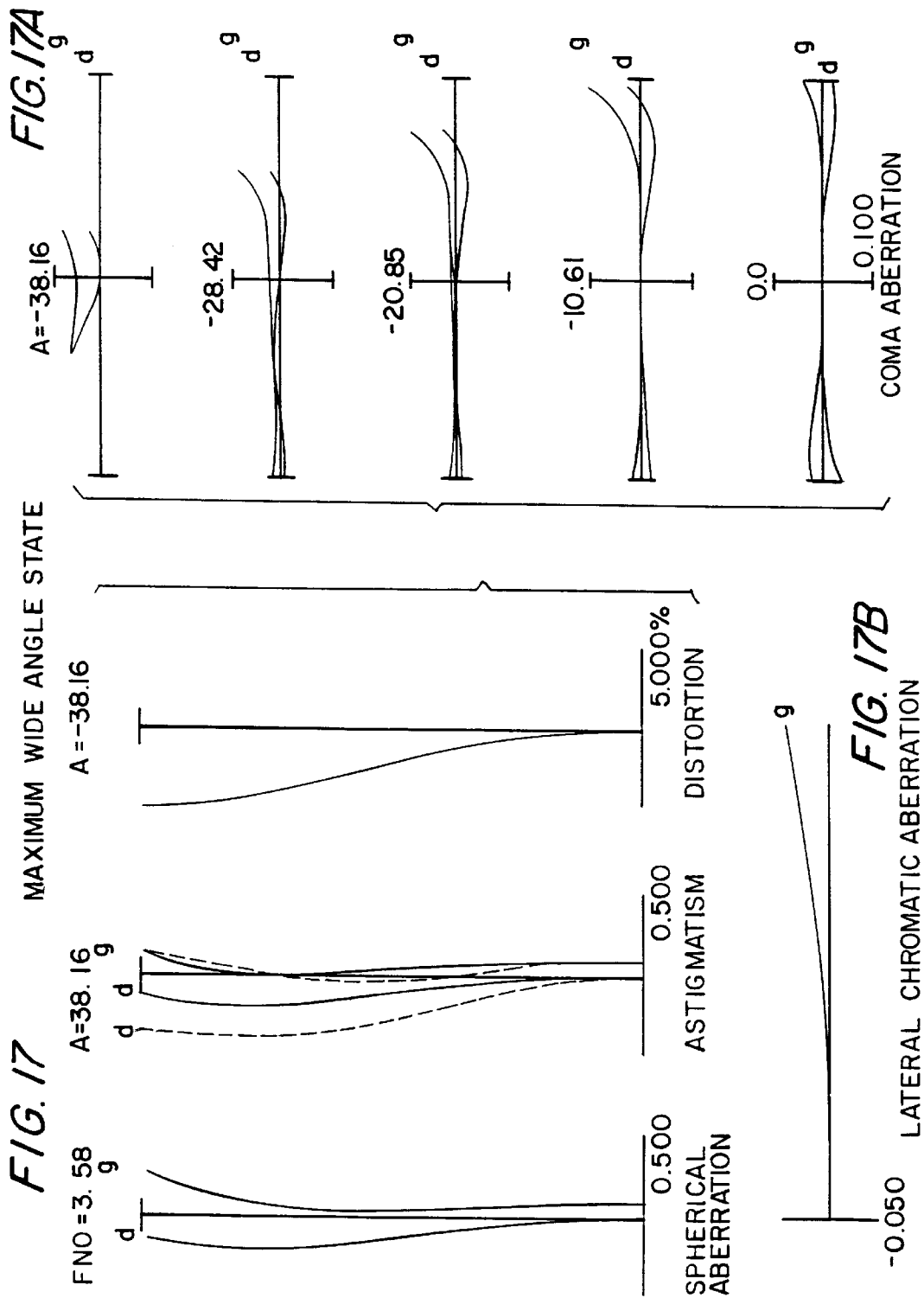

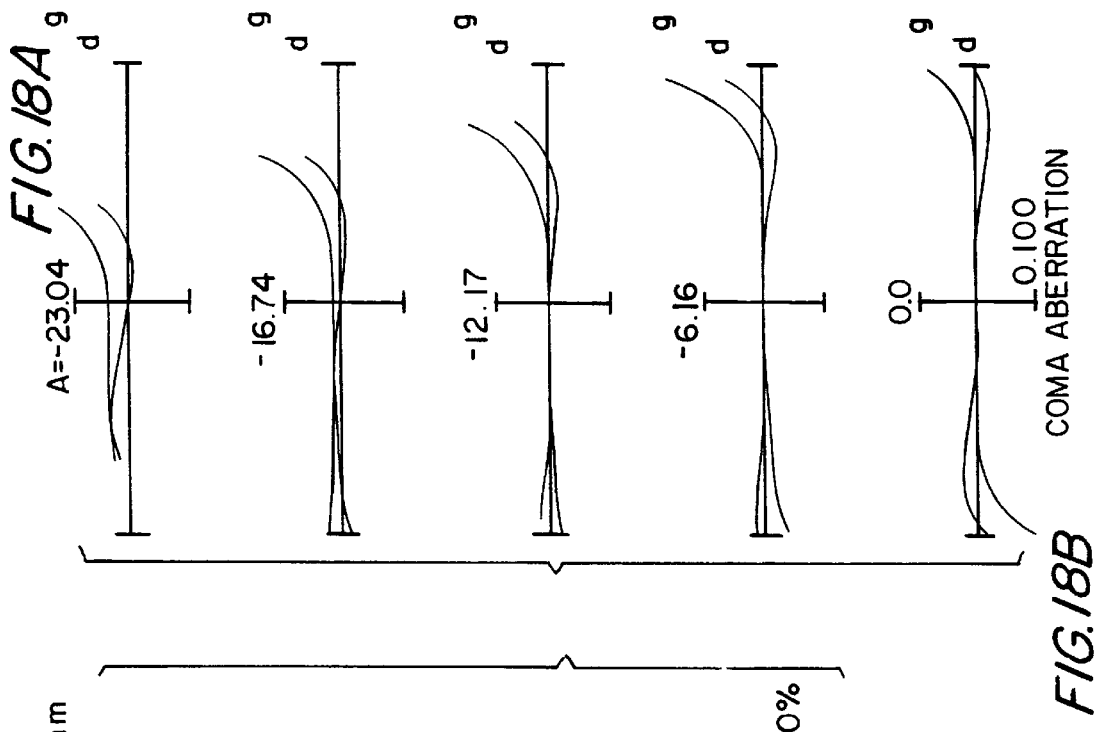

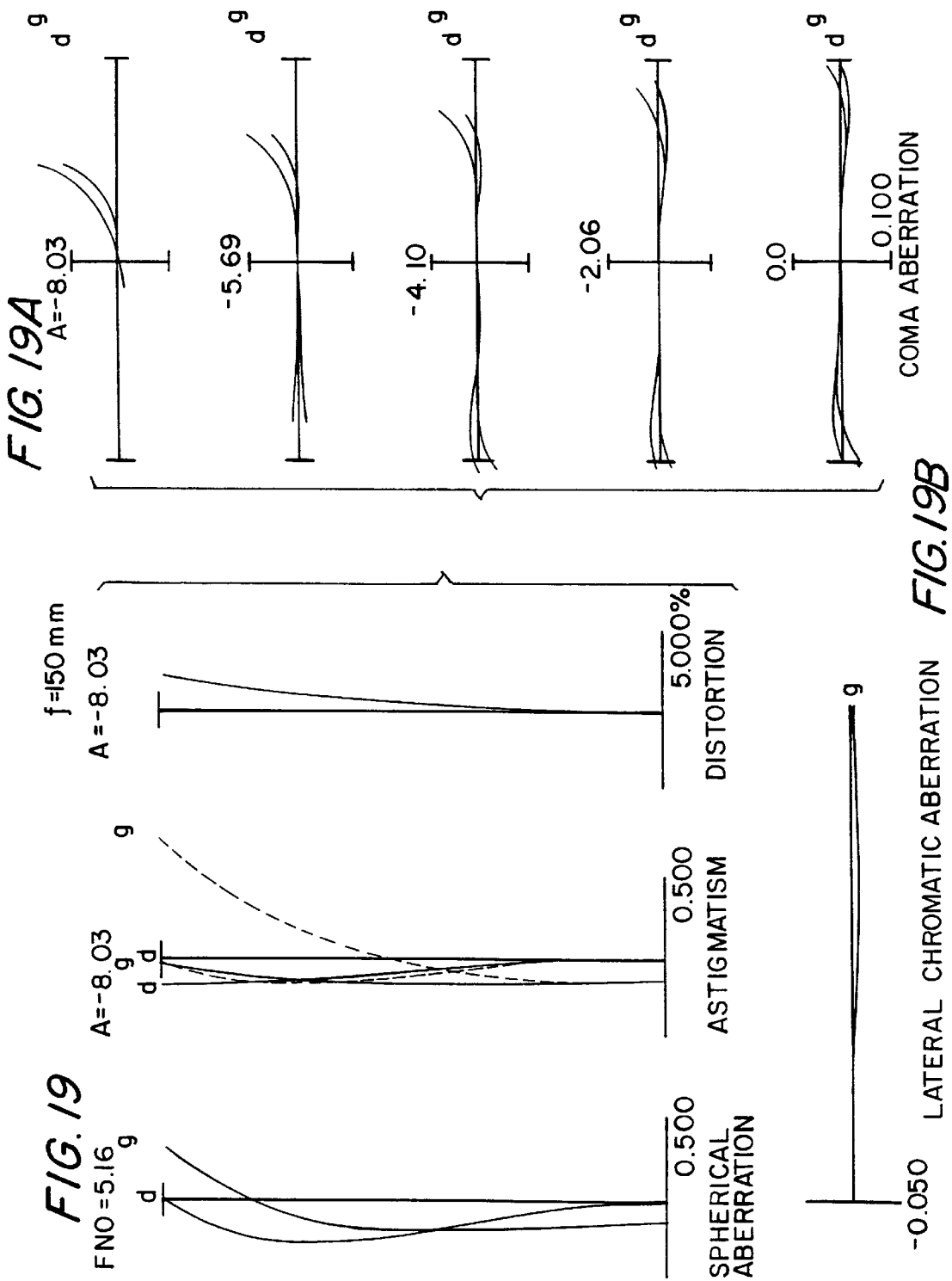

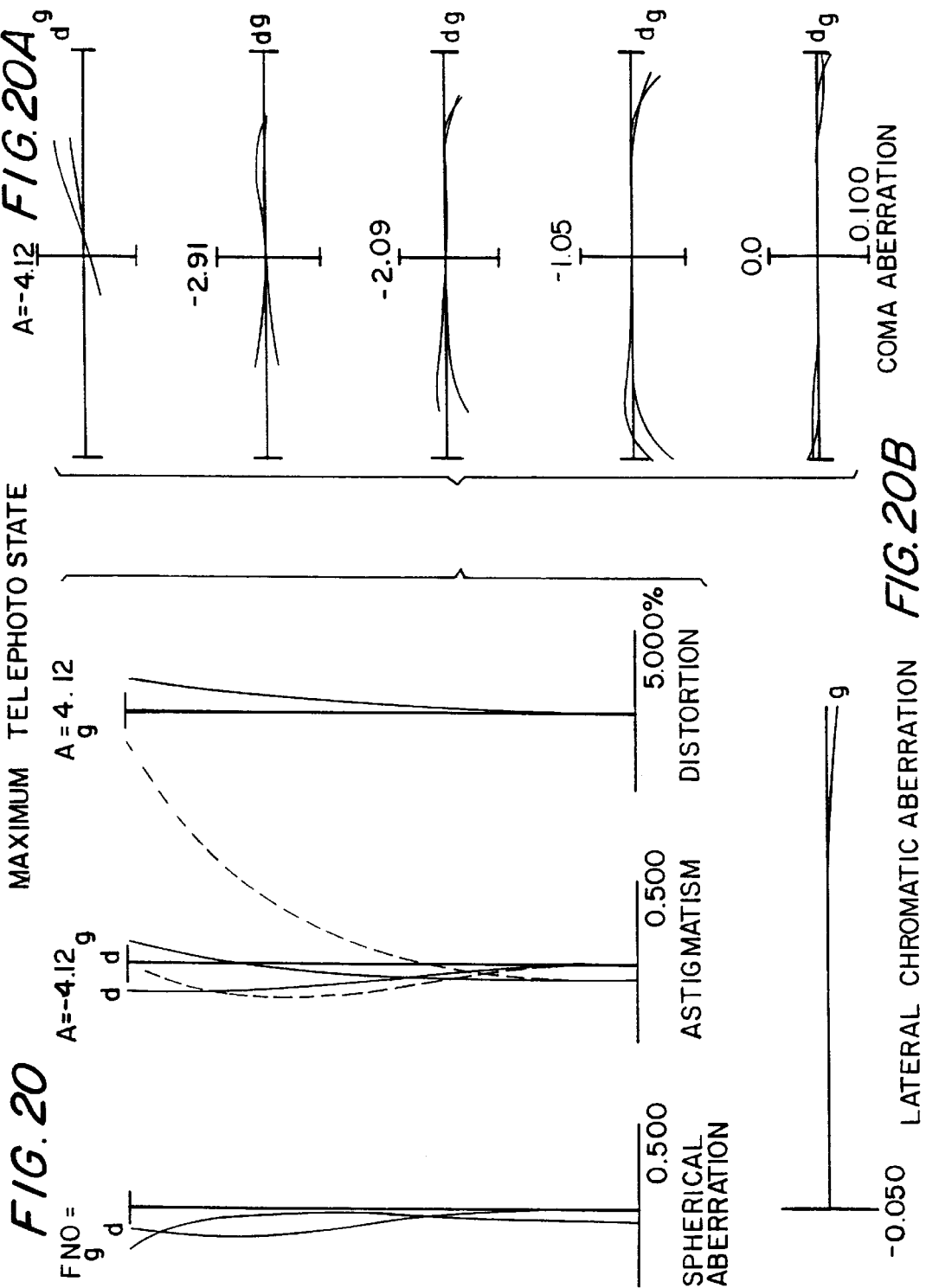

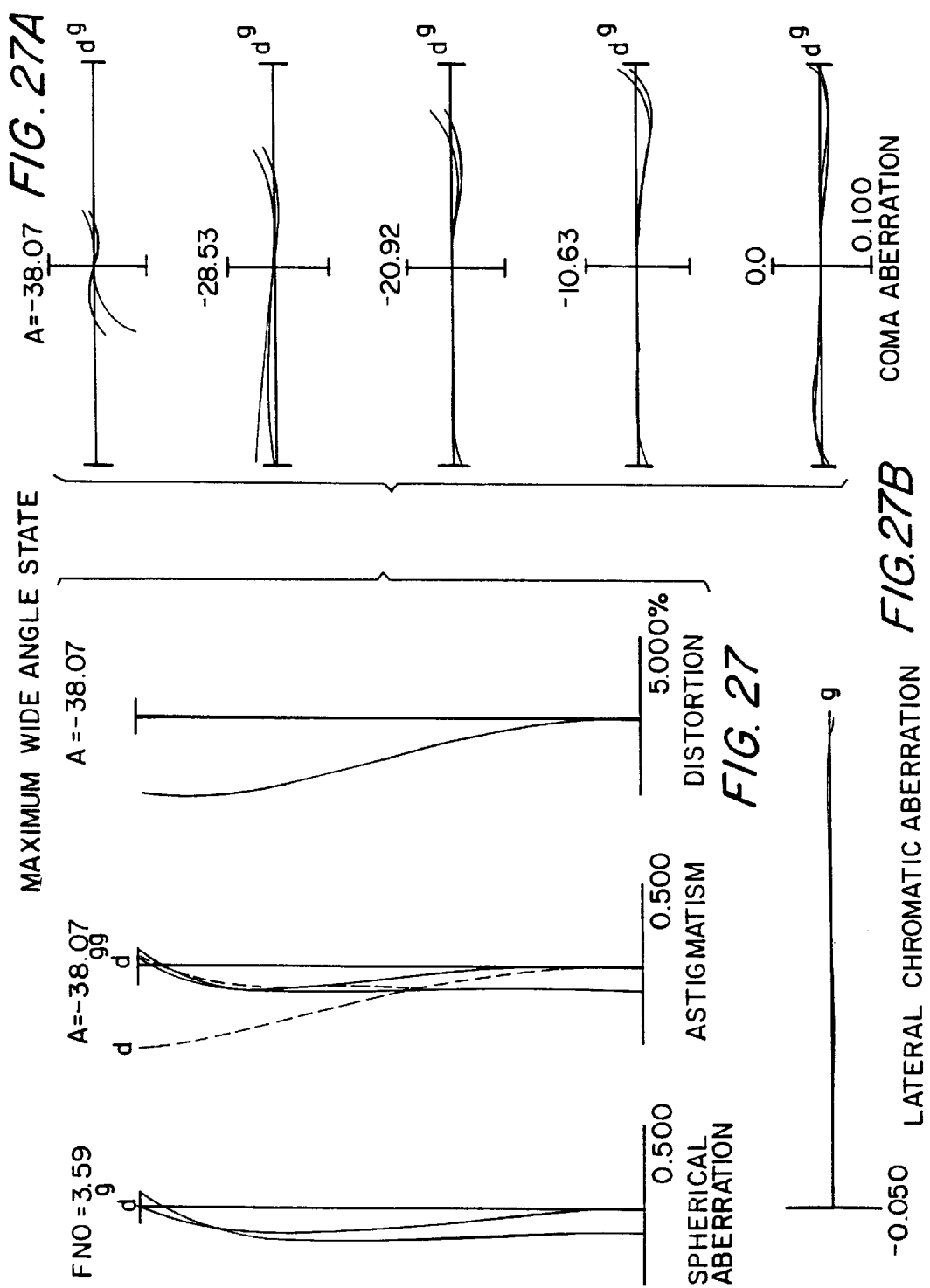

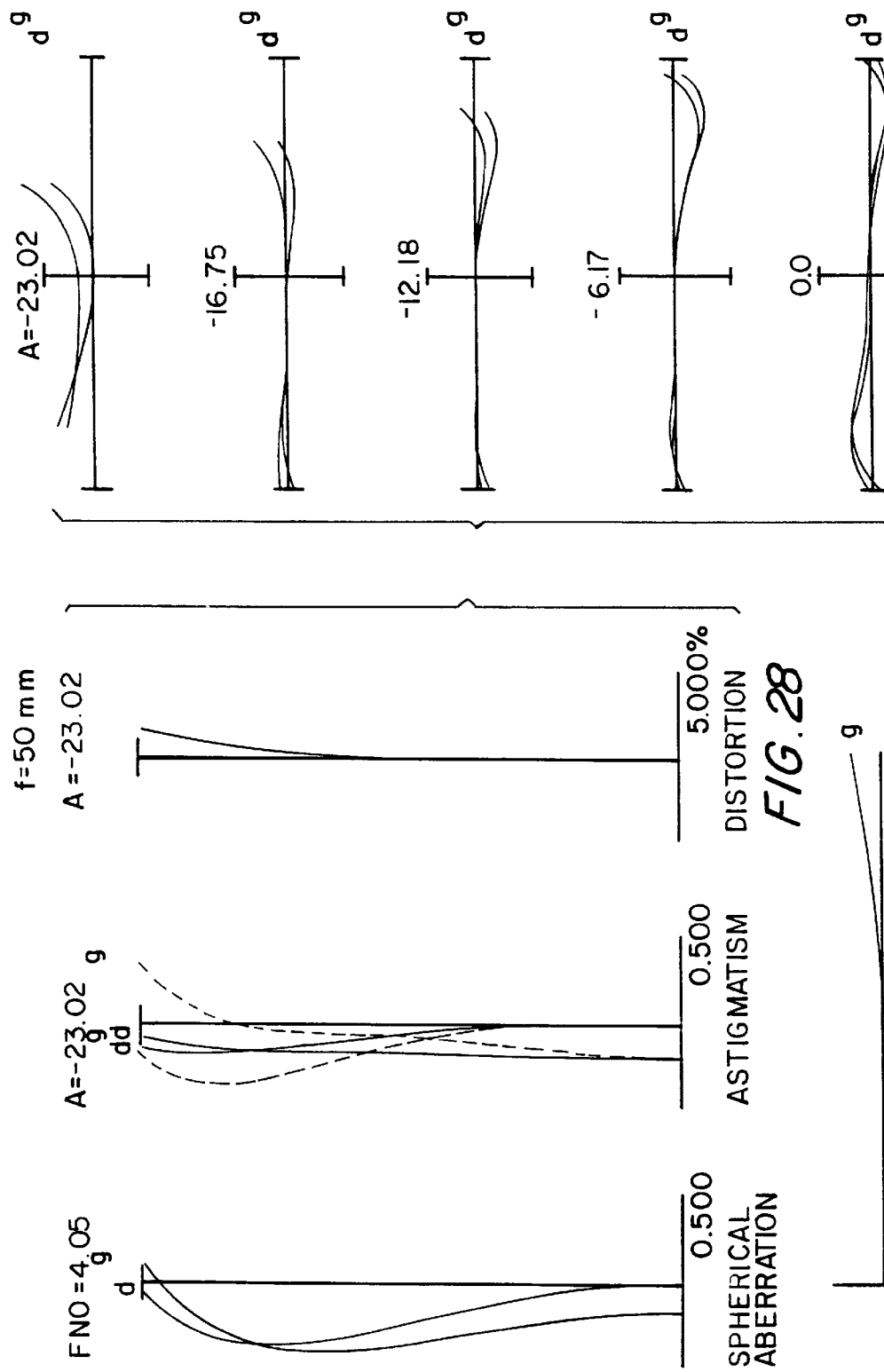

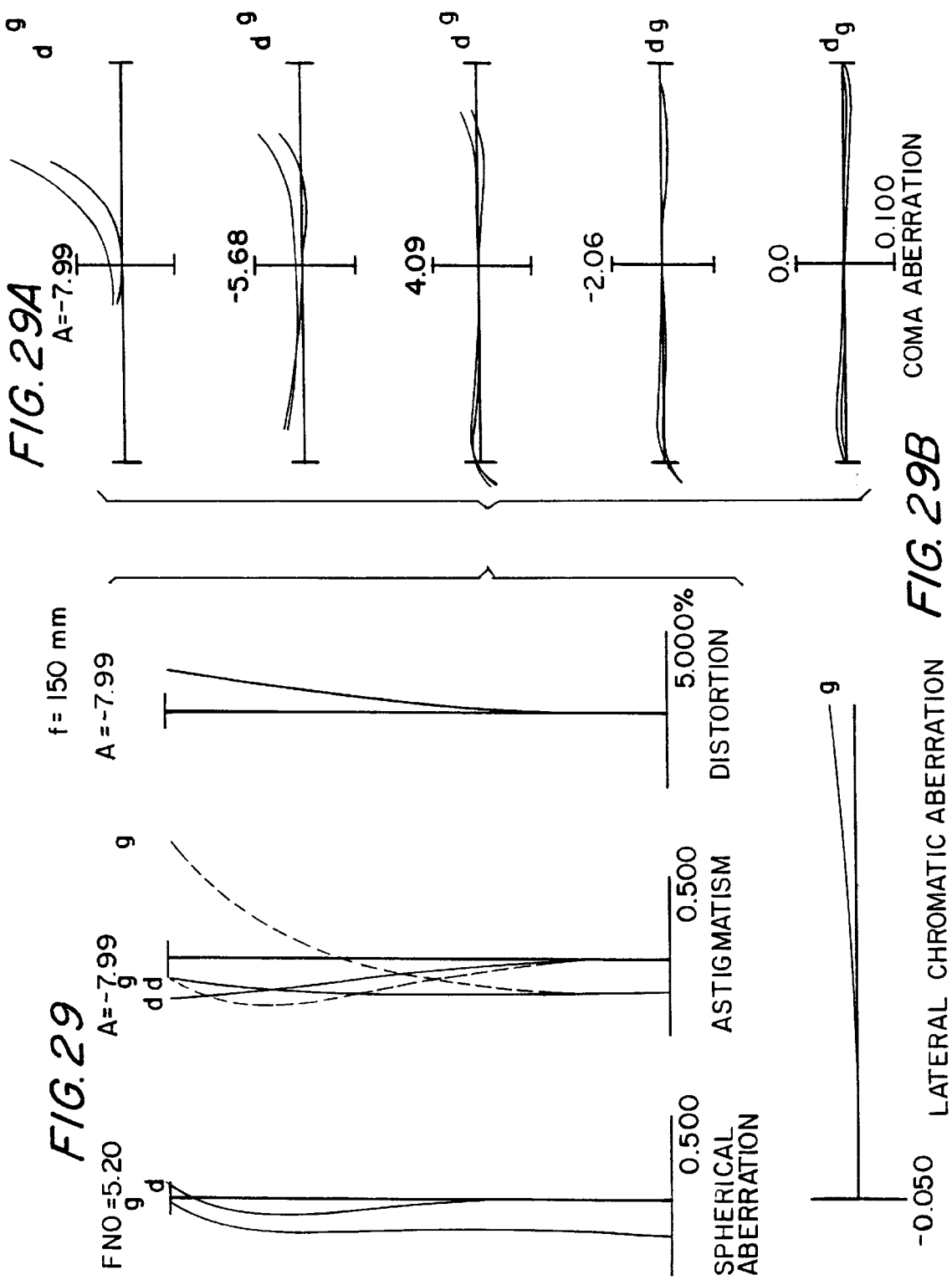

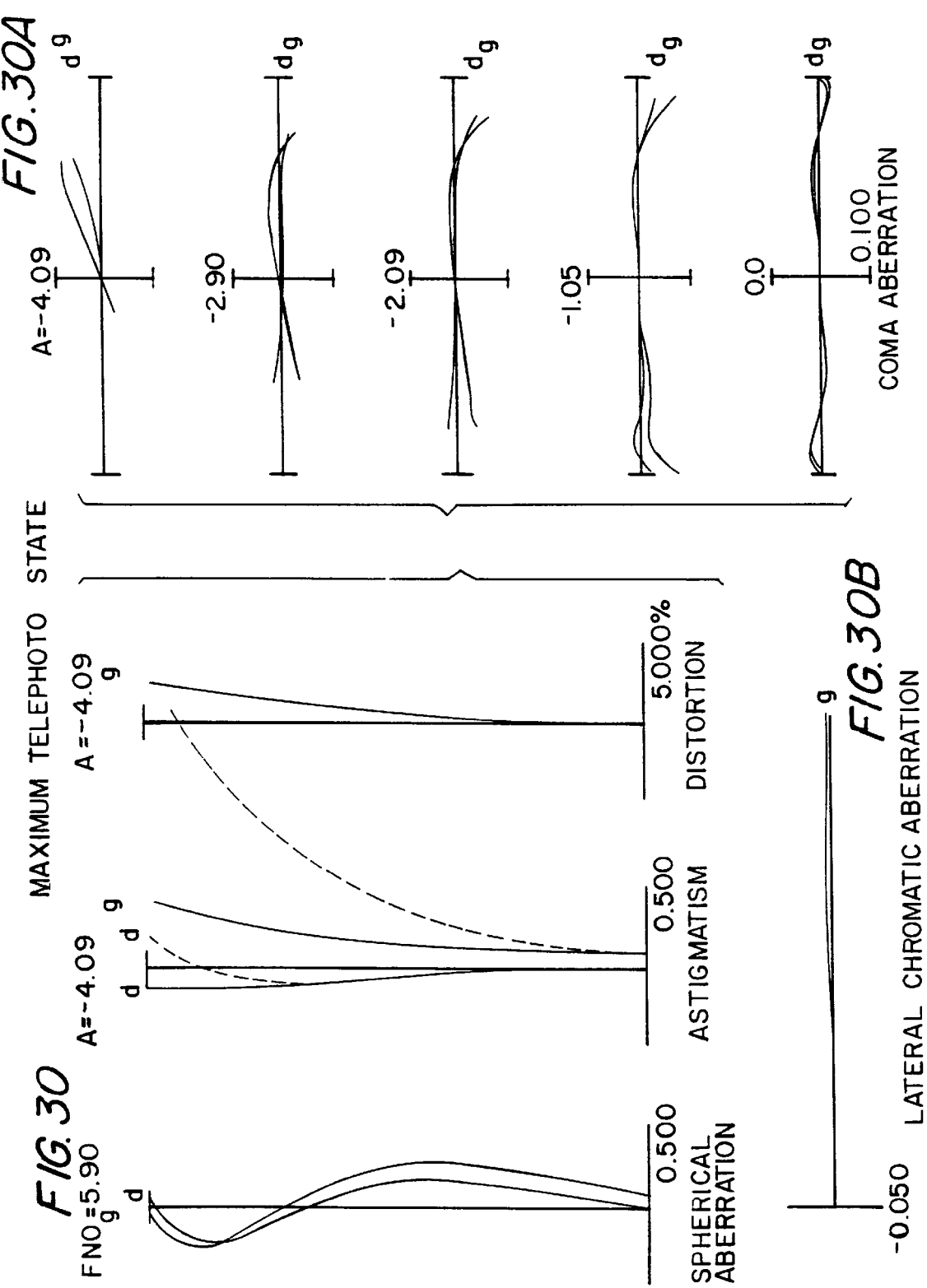

ZOOM LENS SYSTEM HAVING HIGH ZOOM RATIO

The present invention relates to a zoom lens. More particularly, the present invention relates to a zoom lens system having high zoom ratio and having five or more lens groups.

BACKGROUND OF THE INVENTION

In the past, a number of zoom lens systems having a high zoom ratio comprising positive-negative-positive-negative-positive lens groups have been proposed. Also, this idea was disclosed in Japanese Patent Kokai (laid-open patent application) No. S57-164709 (1982). This lens proposed to cover a field angle of 2ω=64° and a zoom ratio on the order of approximately 3.7×. Later, Kokai No. S63-266415 (1988) proposed a zoom lens with a field angle of 2ω=62° and a zoom ratio of approximately 9×. More recently, Kokai No. H4-186212 (1992) disclosed a zoom lens made up of six lens groups (positive-negative-positive-negative-positive-negative), with a field angle of 26ω=62° and a zoom ratio of approximately 9×.

The zoom lens of Kokai No. S57-164709, however, actually had a zoom ratio on the order of 3, and a field angle of only 62°. With the optical system configuration/refractive power placement (the placement/distribution of refractive power along the optical axis) as disclosed in this Kokai, or that along an extension thereof, it would be extremely difficult to obtain a zoom lens covering a field angle in excess of 2ω=75° with magnification ratio of around 10×. Also, although Kokai No. S63-266415 and Kokai No. H4-186212 provide a good level of correction for aberrations, like the lens disclosed in the above Kokai, they provide field angles on the order of only about 62°. And there is a need for a zoom lens with a higher zoom ratio and larger field angle than is presently available.

SUMMARY OF THE INVENTION

Accordingly, it is a general object of the present invention to provide a compact zoom lens system with a high zoom ratio in excess of 10×.

A preferred embodiment of the present invention includes a zoom lens system comprising, in order from the object side: a first lens group having a positive refractive power; a second lens group having a negative refractive power; a third lens group having a positive refractive power; a fourth lens group having a negative refractive power; and a fifth lens group having a positive refractive power.

When this preferred embodiment is operated from its maximum wide-angle state to its maximum telephoto state, the air-space separation between the first lens group and the second lens group is increased, the air-space separation between the second lens group and the third lens group is decreased, the air-space separation between the third lens group and the fourth lens group is increased, and the air-space separation between the fourth lens group and the fifth lens group is decreased. The system also satisfies the following condition(1):

$$2.3 < (D_{IT} - D_{IW})/fw < 10 \tag{1}$$

where $D_{IT}$ is the separation between the first lens group and the second lens group in the maximum telephoto state, $D_{IW}$ is the separation between the first lens group and the second lens group in the maximum wide-angle state, and fw is the focal length of the total zoom lens system in the maximum wide-angle state.

In another preferred embodiment, the zoom lens system satisfies the following condition (2):

$$6 < f1/|f2| < 15 \tag{2}$$

where f1 is the focal length of the first lens group and f2 is the focal length of the second lens group.

In yet another embodiment, the second lens group of the zoom lens system moves toward the object side of the zoom lens system when the system is operated from the maximum wide-angle state to the maximum telephoto state.

In a further preferred embodiment, the second lens group comprises, in order from the object side, a first lens subgroup of negative refractive power having negative lens components, a second lens subgroup of positive refractive power, and a third lens subgroup of negative refractive power having negative lens components. In such an embodiment, one of the negative lens components within the second lens group that is positioned nearest the object side of the zoom lens system has at least one aspheric surface.

In further preferred embodiments, the zoom lens system satisfies one or more of the following conditions (3) through (6):

$$0.1 < f3/fT < 0.3 \tag{3}$$

where f3 is the focal length of the third lens group, and fT is the focal length of the total zoom lens system in the maximum telephoto state;

$$-0.6 < f4/fT < -0.2 \tag{4}$$

where f4 is the focal length of the fourth lens group, and fT is the focal length of the total zoom lens system in the maximum telephoto state;

$$0.05 < f5/fT < 0.7 \tag{5}$$

where f5 is the focal length of the fifth lens group, and fT is the focal length of the total zoom lens system in the maximum telephoto state; and $$-0.7 < f6/fT < -0.05 \tag{6}$$

where f6 is the focal length of the sixth lens group, and fT is the focal length of the total zoom lens system in the maximum telephoto state.

BRIEF DESCRIPTION OF THE DRAWINGS

The above and other objects, features, and advantages of the present invention will become more apparent from the following detailed description taken with the accompanying drawings, in which:

FIG. 2 shows plots of aberrations in the first embodiment, with the lens in the maximum wide-angle state and focused on infinity;

FIG. 3 shows plots of aberrations in the first embodiment, with the lens at an intermediate focal length (50 mm) and focused on infinity;

FIG. 4 shows plots of aberrations in the first embodiment, with the lens at an intermediate focal length (150 mm) and focused on infinity;

FIG. 5 shows plots of aberrations in the first embodiment, with the lens in the maximum telephoto state and focused on infinity;

FIG. 12 shows plots of aberrations in the third embodiment, with the lens focused on infinity and in the maximum wide-angle state;

FIG. 13 shows plots of aberrations in the third embodiment, with the lens at an intermediate focal length (50 mm) and focused on infinity;

FIG. 14 shows plots of aberrations in the third embodiment, with the lens at an intermediate focal length (150 mm) and focused on infinity;

FIG. 15 shows plots of aberrations in the third embodiment, with the lens in the maximum telephoto state and focused on infinity;

FIG. 17 shows plots of aberrations in the fourth embodiment, with the lens in the maximum wide-angle state and focused on infinity;

FIG. 18 shows plots of aberrations in the fourth embodiment, with the lens at an intermediate focal length (50 mm) and focused on infinity;

FIG. 19 shows plots of aberrations in the fourth embodiment, with the lens at an intermediate focal length (150 mm) and focused on infinity;

FIG. 20 shows plots of aberrations in the fourth embodiment, with the lens in the maximum telephoto state and focused on infinity;

FIG. 27 shows plots of aberrations in the sixth embodiment, with the lens in the maximum wide-angle state and focused on infinity;

FIG. 28 shows plots of aberrations in the sixth embodiment, with the lens at an intermediate focal length (50 mm) and focused on infinity;

FIG. 29 shows plots of aberrations in the sixth embodiment, with the lens at an intermediate focal length (150 mm) and focused on infinity; and FIG. 30 shows plots of aberrations in the sixth embodiment, with the lens in the maximum telephoto state and focused on infinity.

DESCRIPTION OF THE PREFERRED EMBODIMENTS

Figure 1:
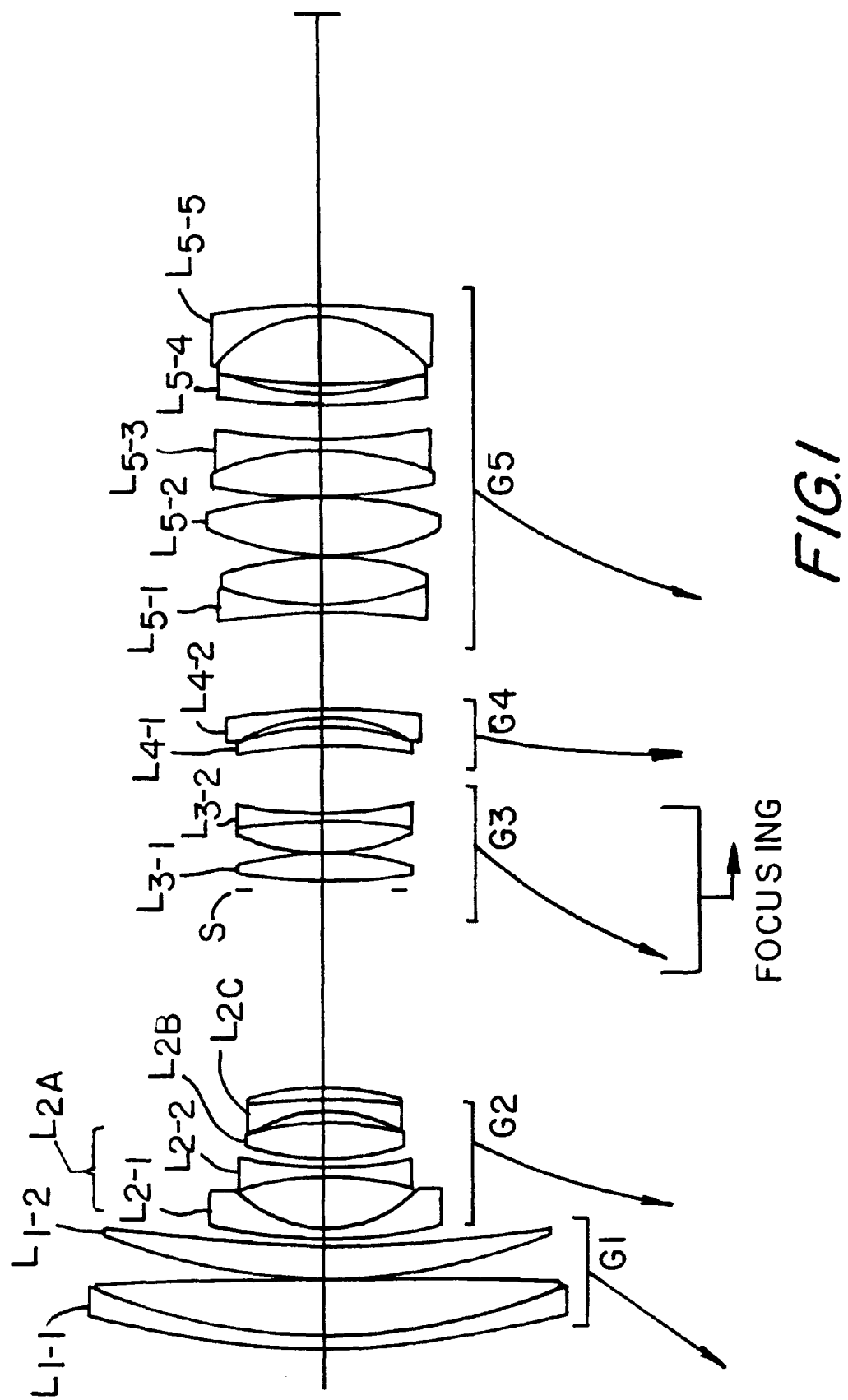
FIG. 1 is a diagram showing the configuration and lens motion loci of a first embodiment of the present invention.

First, the basic structure of the apparatus incorporating the principles of the present invention will be explained. The apparatus incorporating the principles of the present invention has at least five lens groups (positive-negative-positive-negative-positive). This type of multiple-lens-group zoom lens (positive-negative-positive-negative-positive/positive-negative-positive-negative-positive-negative) is best understood by thinking of the lens system as a double zoom lens in which the task of zooming is distributed among positive-negative lens group pairs in order to reduce the distance traveled by the lens groups during zooming. This is desirable to obtain a smaller zoom lens system.

In a zoom lens such as that of the present invention, where the zoom ratio is in excess of 10×, the amount of movement of the first and second lens groups for zooming are particularly important in reducing the size and diameter of the lens. In the apparatus incorporating the principles of the present invention, with the lens in the maximum wide-angle state, negative refractive power of retrofocus type becomes stronger relative to the positive refractive power of one, because of decreasing the air-space separation between the first and second lens groups G1 and G2, as well as that between the third and fourth lens groups G3 and G4.

Also, to achieve a high-zoom ratio in accordance with the principles of the present invention, the first and second lens groups are composed so that they can be moved to provide an adequate increase in separation between the first and second lens groups. In the embodiments of the present invention, this is done in a manner so as to satisfy the above condition (1).

Condition (1) defines the condition that must be met to have the proper amount of change in air-space separation between the first lens group G1 and second lens group G2 when zooming between the maximum wide-angle and maximum telephoto states of the zoom lens system.

If the lower limit of condition (1) is exceeded, the change in the air-space separation between the first and second lens groups is decreased. With this situation, in order to obtain about the same zoom ratio as in the embodiments of the present invention, the first and second lens groups would both have to have stronger refractive power. If this is done, too much of an increase in the refractive power of the second lens group would be undesirable in that it leads to the following problems:

increased distortion at the wide-angle end of the zoom range, increased astigmatism due to degradation of the Petzval sum, variation in lower side coma (coma regarding rays under the principal ray) with changes in zooming, and increased spherical aberration close to maximum telephoto state of the zoom range.

A large increase in the refractive power of the first lens group would also be undesirable in that it would result in the principal ray at the maximum field angle being incident at a location well removed from the optical axis, thus requiring a larger filter. Moreover, raising the lower limit in condition (1) to 2.65 will provide a zoom lens with better aberration correction characteristics and a smaller diameter filter size. The best results can be obtained from the present invention by increasing the value of the lower limit of condition (1) to 3.

If the upper limit of condition (1) is exceeded, the change in the air-space separation between the first and second lens will be extremely large, which makes the total length of the lens extremely long. This makes it more difficult to design the lens barrel. This is also undesirable in that the change in F-number will effectively be larger, causing the F-number of the zoom lens system to be larger particularly at the maximum telephoto state of the zoom range. Better lens barrel design conditions will be obtained by setting the value of the upper limit of condition (1) to 7, while the best results can be obtained from the present invention by lowering the value of the upper limit of condition (1) to 5.

The refractive power balance between the first and second lens groups is also an important factor in reducing the size and diameter of the lens while still achieving a zoom ratio in excess of 10× and a field angle (2ω) in excess of 75° provided by the apparatus incorporating the principles of the present invention. In particular, as discussed earlier, it is preferable to establish the proper refractive power balance between the first and second lens groups for good aberration correction because negative refractive power of retrofocus type becomes stronger relative to positive refractive power of one. Condition (2) defines the range within which this proper refractive power balance between the first and second lens groups is achieved.

When the lower limit of condition (2) is exceeded, the absolute value of the focal length of the second lens group is comparatively large; i.e., the refractive power of the second lens group has been set to a comparatively low value. This state (exceeding lower limit of condition (2)) leads to an increase in both the overall size of the system, and the amount of change in the total length since the amount of movement of the second lens group increases during zooming. In this state, the relatively high refractive power of the first lens group is especially undesirable in that it increases the height of the principal ray in the maximum wide-angle state, thus effectively increasing the filter size. Setting the lower limit in condition (2) to 6.6 will enable a further reduction in filter diameter, while the best results can be obtained by further raising the value of the lower limit of condition (2) to 6.9.

On the other hand, if the upper limit of condition (2) is exceeded, the absolute value of the focal length of the second lens group is comparatively The best results can be obtained from the embodiments of the present invention by lowering the value of the upper limit of condition (3) to 0.25.

In the apparatus incorporating the principles of the present invention, it is also preferred to satisfy the condition (4):

$$-0.6 < f4/fT < -0.2 \qquad (4)$$

where f4 is the focal length of the fourth lens group G4, and fT is the focal length of the total system in the maximum telephoto state.

Condition (4) sets the optimum refractive power range of the fourth lens group.

When the lower limit of condition (4) is exceeded, the absolute value of the focal length of the fourth lens group is comparatively large; i.e., the refractive power of the fourth lens group is set to a comparatively low value. This is undesirable in that it reduces the contribution of the fourth lens group during zooming, thereby effectively increasing the total length of the lens and the amount of movement required. It also reduces the zoom ratio. The best results can be obtained by increasing the value of the lower limit in condition (4) to −0.4.

When the upper limit of condition (4) is exceeded, the absolute value of the focal length of the fourth lens group is comparatively small; i.e., the refractive power of the fourth lens group is set to a comparatively high value. This is undesirable in that it increases the angle of incidence of oblique rays entering the fifth lens group, thus increasing the amount of aberration variations (especially spherical aberrations and positive coma) experienced when the zooming state is in particular, will raise the height of the principal ray at the maximum field angle and intermediate focal length, thus cutting off the principal ray, and an effective increase in filter size. It will also increase the total length at the maximum wide-angle state required to provide adequate air-space separation between the first lens group G1 and the second lens group G2 at the wide-angle end of the zoom range.

In the apparatus incorporating the principles of the present invention, it is also preferred to satisfy the condition (3):

$$0.1 < f3/fT < 0.3 \qquad (3)$$

where f3 is the focal length of the third lens group G3, and fT is the total system focal length in the maximum telephoto state.

Condition (3) sets the optimum refractive power range of the third lens group.

When the lower limit of condition (3) is exceeded, the focal length of the third lens group is comparatively small; i.e., the refractive power of the third lens group is set to a comparatively high value. In this condition it will be very difficult to correct for aberrations, especially spherical aberrations. The best results can be obtained by raising the value of the lower limit of condition (3) to 0.13.

When the upper limit of condition (3) is exceeded, the focal length of the third lens group is comparatively large; i.e., the refractive power of the third lens group is set to a comparatively low value. This will cause problems with increased total length, and increased lens diameter in the fourth and subsequent lens groups. small; i.e., the refractive power of the second lens group has been set to a comparatively high value. This is undesirable in that it leads to problems such as increased distortion at the maximum wide-angle state of the zoom range, increased astigmatism due to degradation of the Petzval sum, variation in lower side coma (coma regarding rays under the principal ray) with changes in zooming, and increased spherical aberration at the maximum telephoto state of the zoom range.

Setting the upper limit in condition (2) to a value of 10 will provide even better aberration correction capability, providing the best possible results from the embodiments of the present invention.

In the apparatus incorporating the principles of the present invention, it is preferable to have the second lens group move toward the object side as the lens zooms from the maximum wide-angle state to the maximum telephoto state. In this regard, if the zoom locus (the path traveled during zooming) is made such that during zooming from the maximum wide-angle state to the maximum telephoto state, the amount of movement of the first lens group is kept comparatively small, and the second lens group is moved well toward the image side of the lens, the height of the principal ray of the maximum field angle in an intermediate focal length state will then raise (apart from the optical axis), thus the principal ray will be eclipsed. This in turn, will cause an increase in filter size. This, changed. The best results can be obtained by setting the value of the upper limit in condition (4) to −0.25.

In the apparatus incorporating the principles of the present invention, it is also preferred to satisfy the condition (5):

$$0.05 < f5/fT < 0.7 \quad (5)$$

where f5 is the focal length of the fifth lens group G5, and fT is the focal length of the total system in the maximum telephoto state.

Condition (5) sets the optimum refractive power range of the fifth lens group.

When the lower limit of condition (5) is exceeded, the focal length of the fifth lens group is comparatively small; i.e., the refractive power of the fifth lens group is set to a comparatively high value. This is undesirable in that it increases aberration (especially positive coma and astigmatism), and increases the variations in field curvature for a given change in zooming state. The best results can be obtained by increasing the value of the lower limit in condition (5) to 0.1.

When the upper limit of condition (5) is exceeded, the focal length of the fifth lens group is comparatively large; i.e., the refractive power of the fifth lens group is set to a comparatively low value. This causes problems with increased total length, and increased diameter in the lenses of the fifth and subsequent lens groups.

The best results can be obtained by setting the value of the upper limit in condition (5) to 0.35.

In the apparatus incorporating the principles of the present invention, it is preferable that the second lens group be made up of three (negative-positive-negative) lens subgroups, with the negative lens component nearest the object side having an aspheric surface. This configuration provides a wider field angle and also ensures adequate brightness.

For this aspheric surface it is especially desirable to utilize the conical constant κ (kappa) and the odd-order terms of the aspheric constant expressed in the aspheric surface equation to enhance flexibility for aberration corrections. This provides excellent correction, including the balancing of high-order astigmatism against distortion at the wide-angle end, and can also effect correction for lower side coma (coma regarding rays under the principal ray).

As will be seen in Embodiments 4, 5, and 6, to be described later, the apparatus incorporating the principles of the present invention may also include a sixth lens group G6. This sixth lens group is an additional negative lens group placed at the image side of the fifth lens group to thus form a positive-negative-positive-negative-positive-negative configuration.

The additional sixth lens group G6 of this six-group (positive-negative-positive-negative-positive-negative) configuration travels in a zoom locus that is different from that of the other groups. This is particularly effective in correcting for variations in upper side coma (coma regarding rays under the principal ray), in astigmatism, and in field curvature during zooming. Accordingly, this configuration provides additional advantages with respect to reducing the total number of lenses in the configuration, and reducing the overall length of the optical lens system. When using this configuration, it is preferable for the refractive power of the negative sixth lens group G6 to be set within the appropriate range.

It is preferable that sixth lens group G6 be configured to satisfy the following condition (6):

$$-0.7 < f6/fT < -0.05 \quad (6)$$

where f6 is the focal length of the sixth lens group G6 and fT is the focal length of the total lens system at the maximum telephoto state.

When the lower limit of condition (6) is exceeded, the absolute value of the focal length of the sixth lens group is comparatively large; i.e., the refractive power of the sixth lens group is set to a comparatively low value. This causes problems with increased overall length, and larger lens diameter of the sixth lens group.

The best results can be obtained by setting the value of the lower limit in condition (6) to −0.5.

When the upper limit of condition (6) is exceeded, the focal length of the sixth lens group is comparatively short; i.e., the refractive power of the sixth lens group is set to a comparatively high value. This is undesirable in that it increases aberrations, especially upper side coma (coma regarding rays over the principal ray), astigmatism, and variations in field curvature with changing zooming state. Raising the upper limit in condition (6) to −0.1 will improve the ability to correct for aberrations. The optimum results can be obtained by setting the value of the upper limit in condition (6) to −0.2.

In the apparatus incorporating the principles of the present invention, it is preferred to perform close-up focusing by moving the third lens group toward the image side of the lens system. An advantage of this method is that variation in incident heights of the principal and Rand (marginal) rays decrease, thus minimizing changes in spherical aberration, field curvature, and astigmatism, during focusing.

Various embodiments of the present invention are described below. As noted above, FIGS. 1, 6, 11, 16, 21, and 26 show the configurations of first, second, third, fourth, fifth, and sixth embodiments, respectively, with zoom travel loci of the lens group indicated by the arrows in the figures as the zoom lens is moved from the maximum wide-angle state to the maximum telephoto state.

Figure 6:
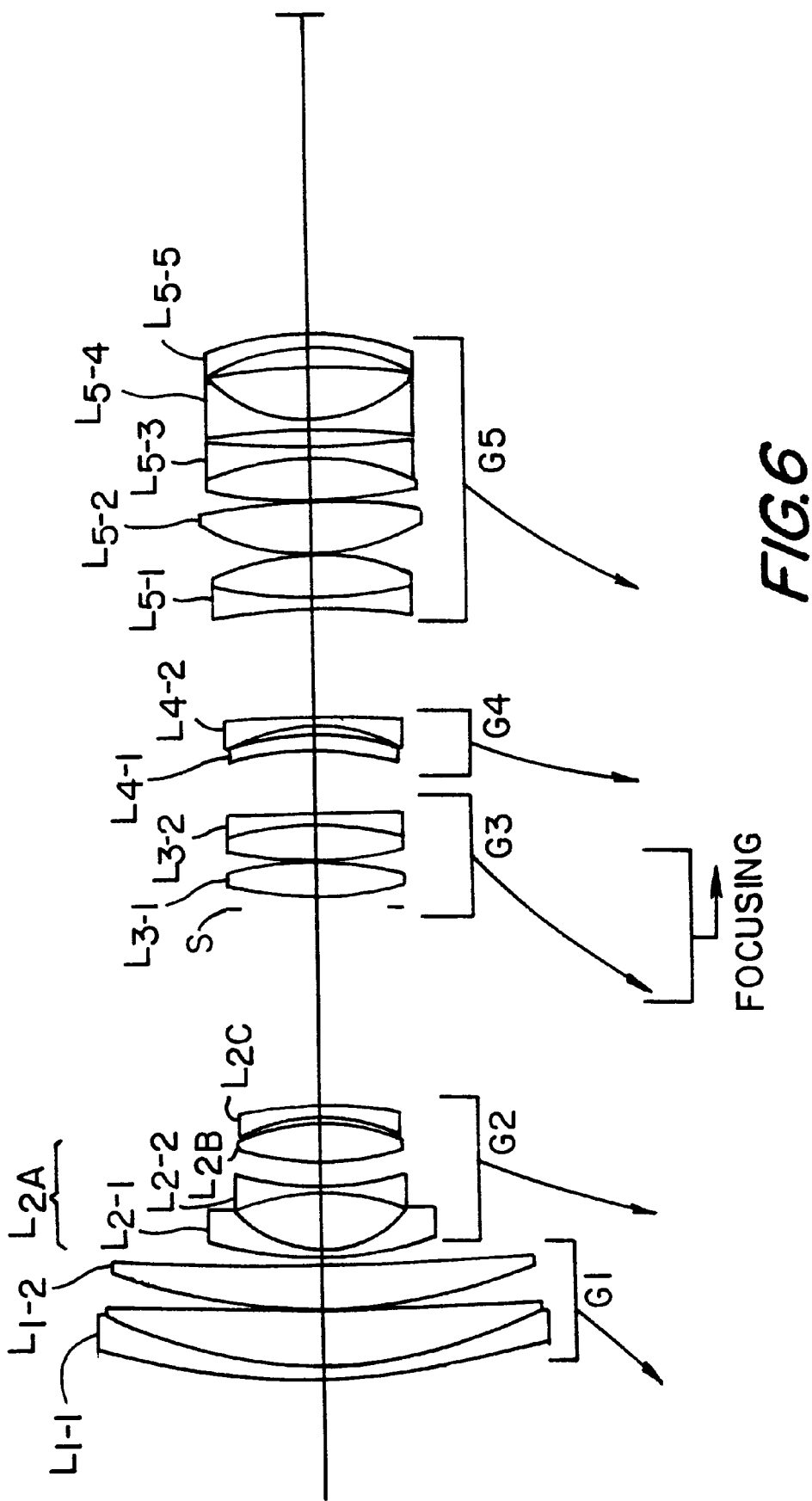
FIG. 6 is a diagram showing the configuration and lens motion loci of a second embodiment of the present invention.
Figure 7:
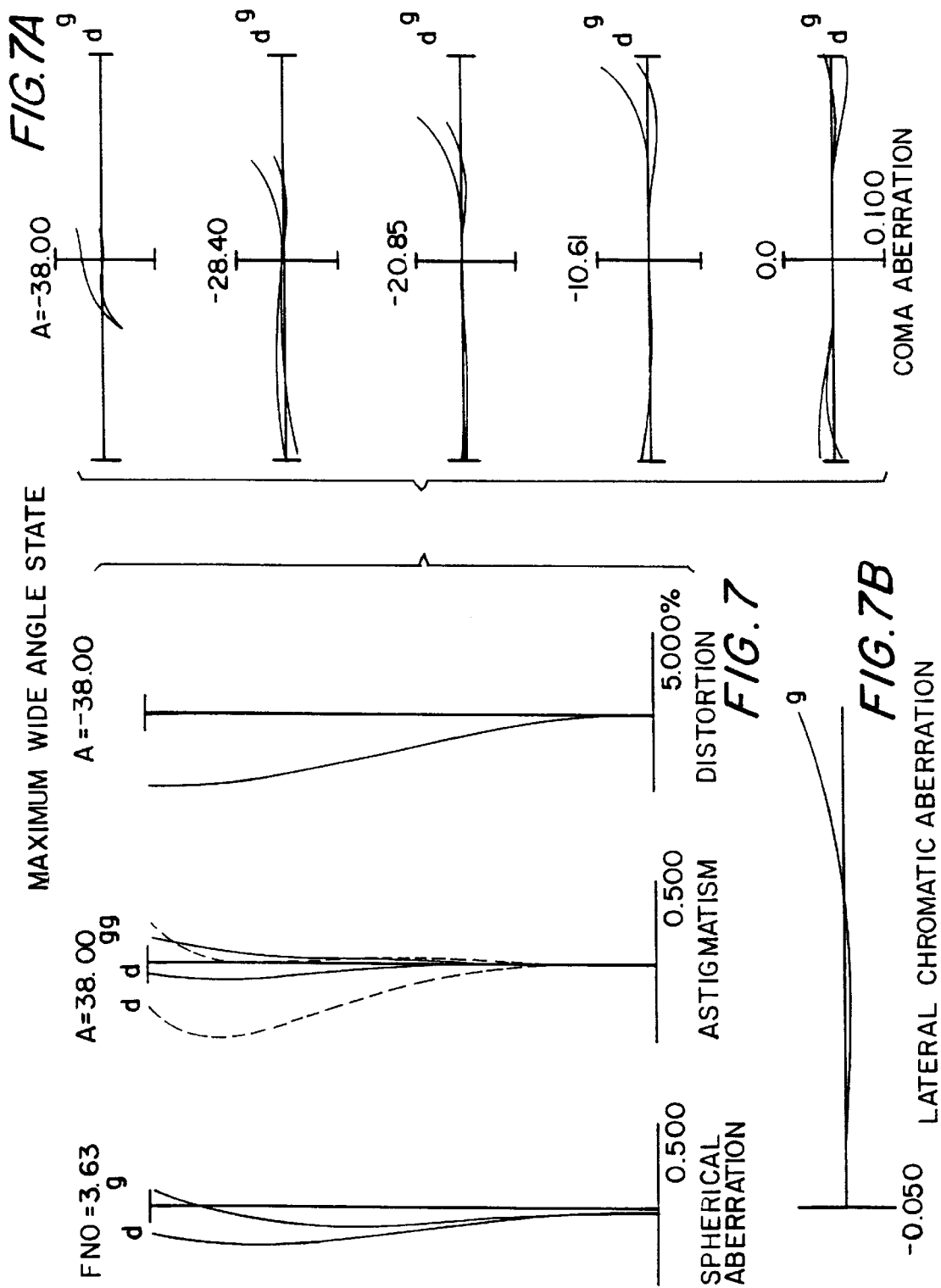
FIG. 7 shows plots of aberrations in the second embodiment, with the lens in the maximum wide-angle state and focused on infinity.
Figure 8:
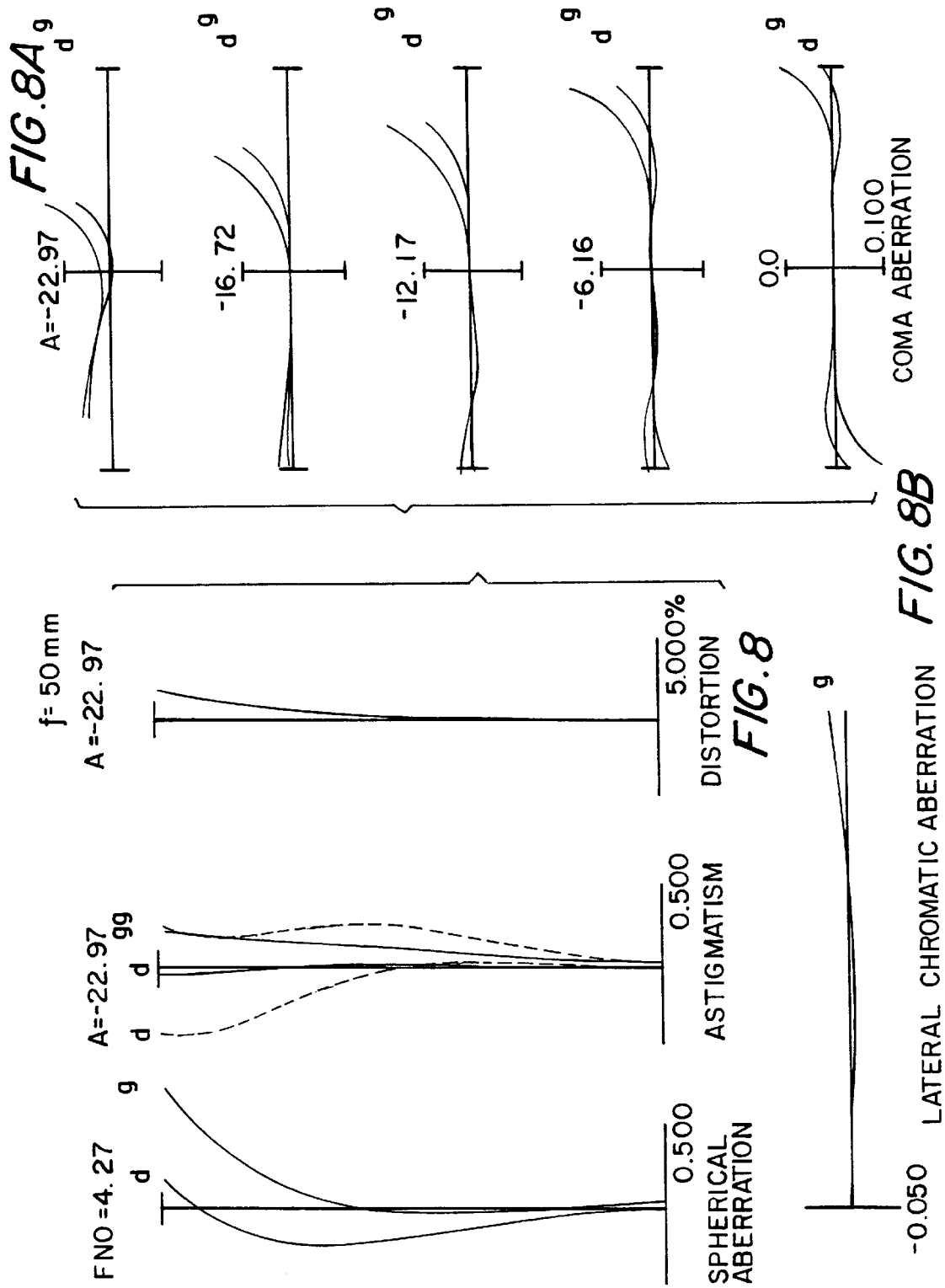
FIG. 8 shows plots of aberrations in the second embodiment, with the lens at an intermediate focal length (50 mm) and focused on infinity.
Figure 9:
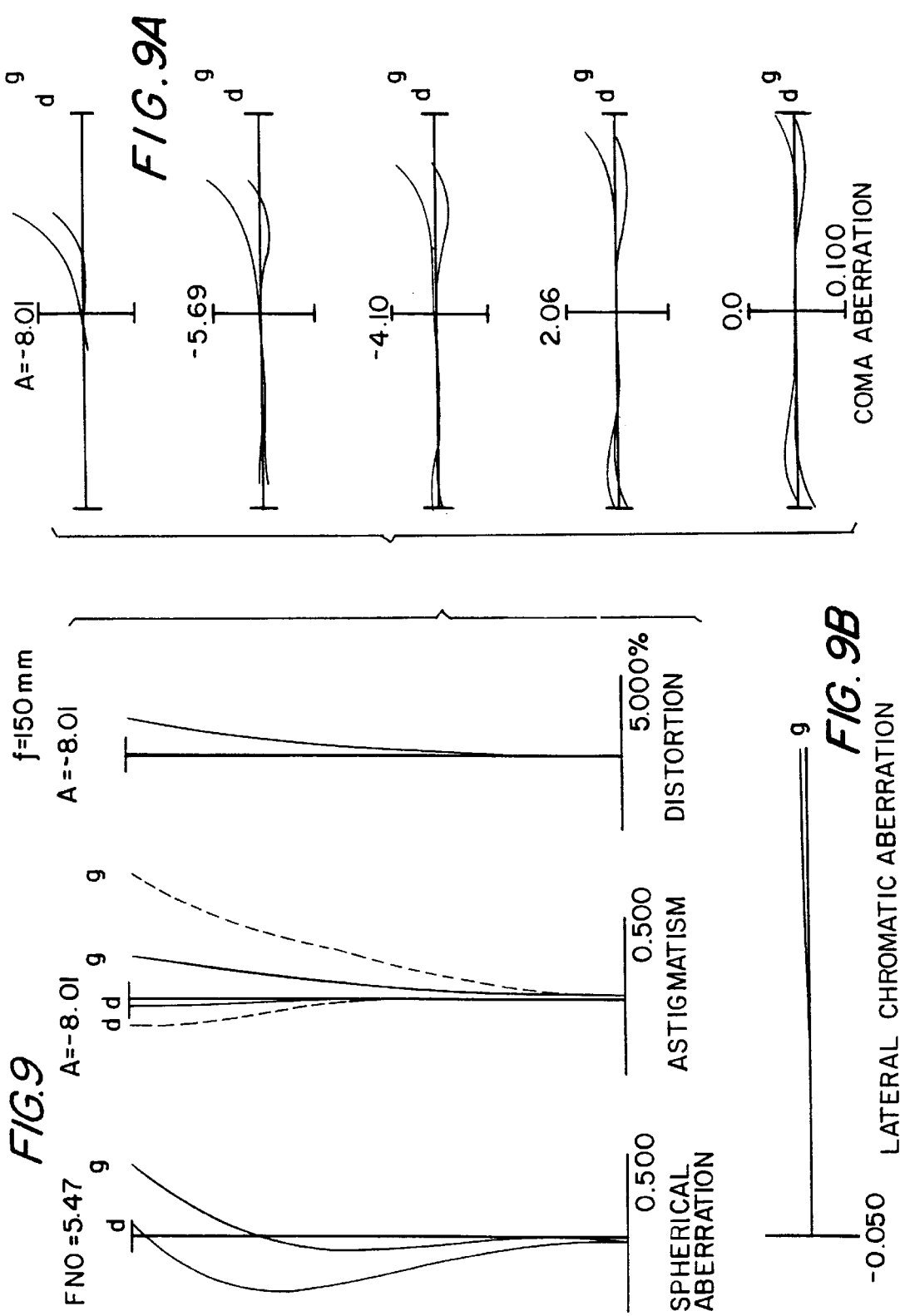
FIG. 9 shows plots of aberrations in the second embodiment, with the lens at an intermediate focal length (150 mm) and focused on infinity.
Figure 10:
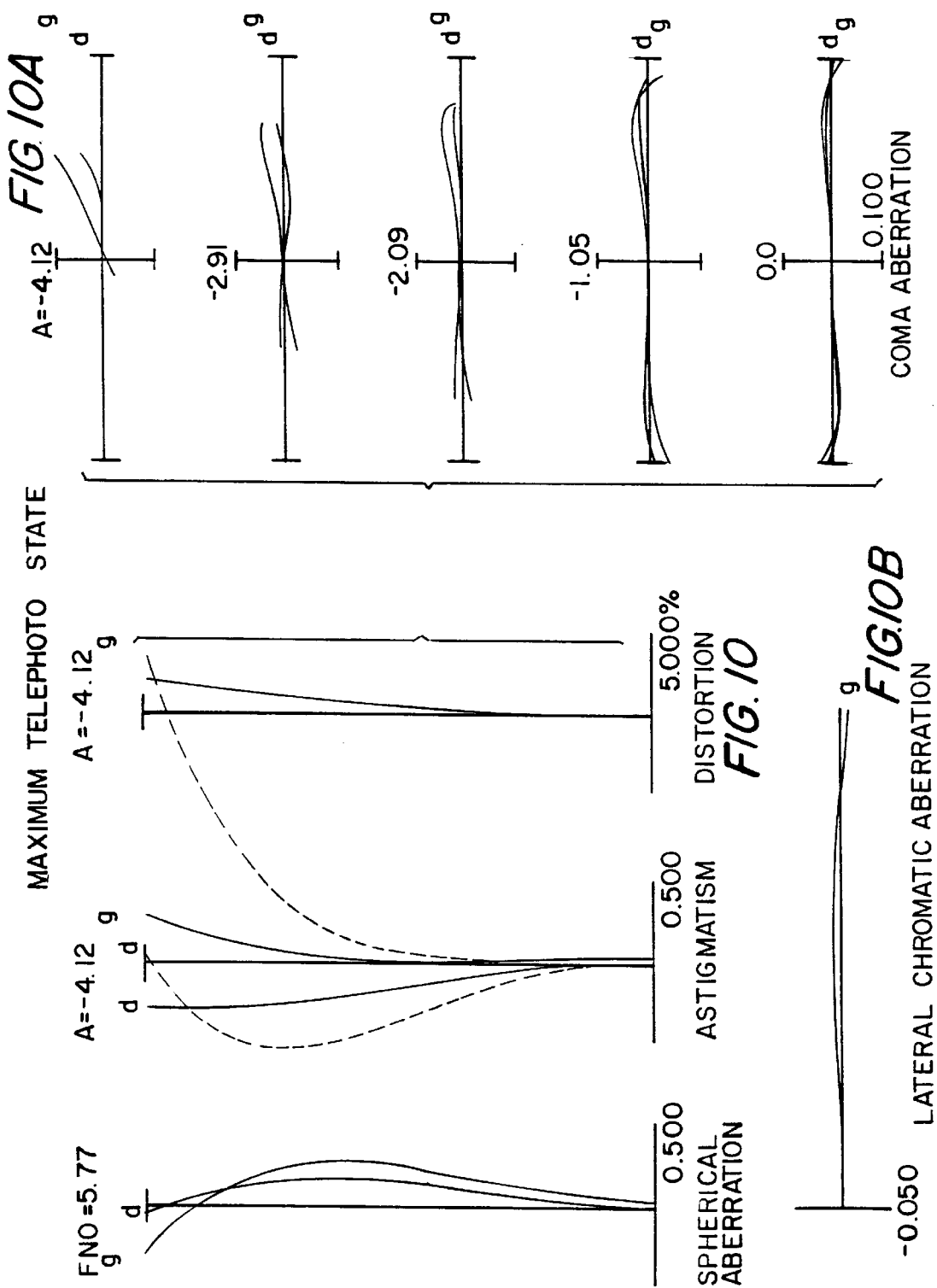
FIG. 10 shows plots of aberrations in the second embodiment, with the lens in the maximum telephoto state and focused on infinity.
Figure 11:
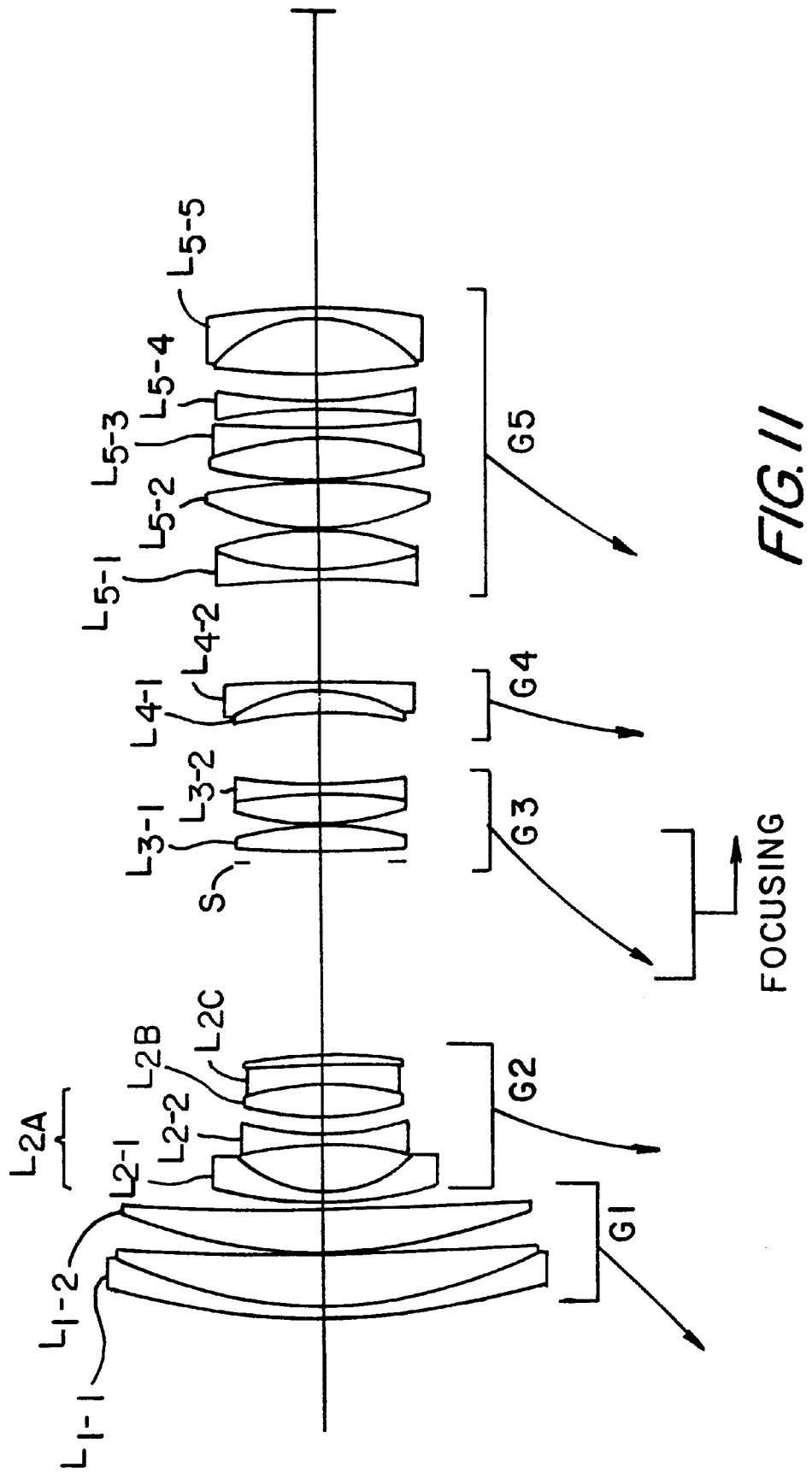
FIG. 11 is a diagram showing the configuration and lens motion loci of a third embodiment of the present invention.

Embodiments 1, 2, and 3, shown in FIGS. 1, 6, and 11, respectively, are made up of the following lens groups, listed in order, from the object side:

first lens group G1, which has positive refractive power,
second lens group G2, which has negative refractive power,
third lens group G3, which has positive refractive power,
fourth lens group G4, which has negative refractive power, and
fifth lens group G5, which has positive refractive power.

Zooming from the maximum wide-angle state to the maximum telephoto state is performed by moving each lens group toward the object side of the zoom lens system such that the positional relationships between the lens groups change as follows:

the air-space separation between the first lens group G1 and the second lens group G2 is increased,
the air-space separation between the second lens group G2 and the third lens group G3 is decreased,
the air-space separation between the third lens group G3 and the fourth lens group G4 is increased, and
the air-space separation between the fourth lens group G4 and the fifth lens group G5 is decreased.

Also, close-up focusing is performed by moving the third lens group G3 toward the image side of the system (toward the right in the illustrations of FIGS. 1, 6, and 11).

Figure 16:
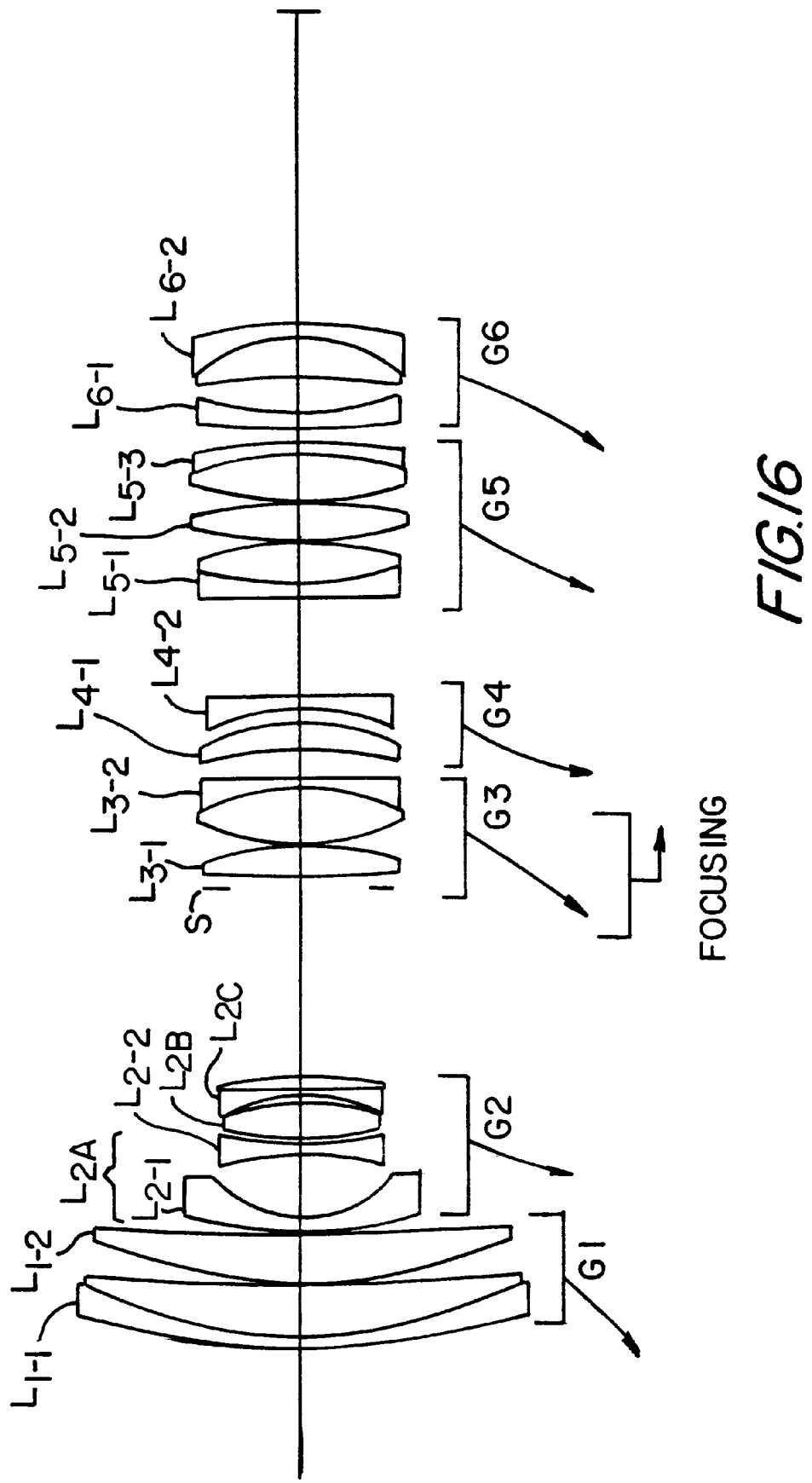
FIG. 16 is a diagram showing the configuration and lens motion loci of a fourth embodiment of the present invention.
Figure 21:
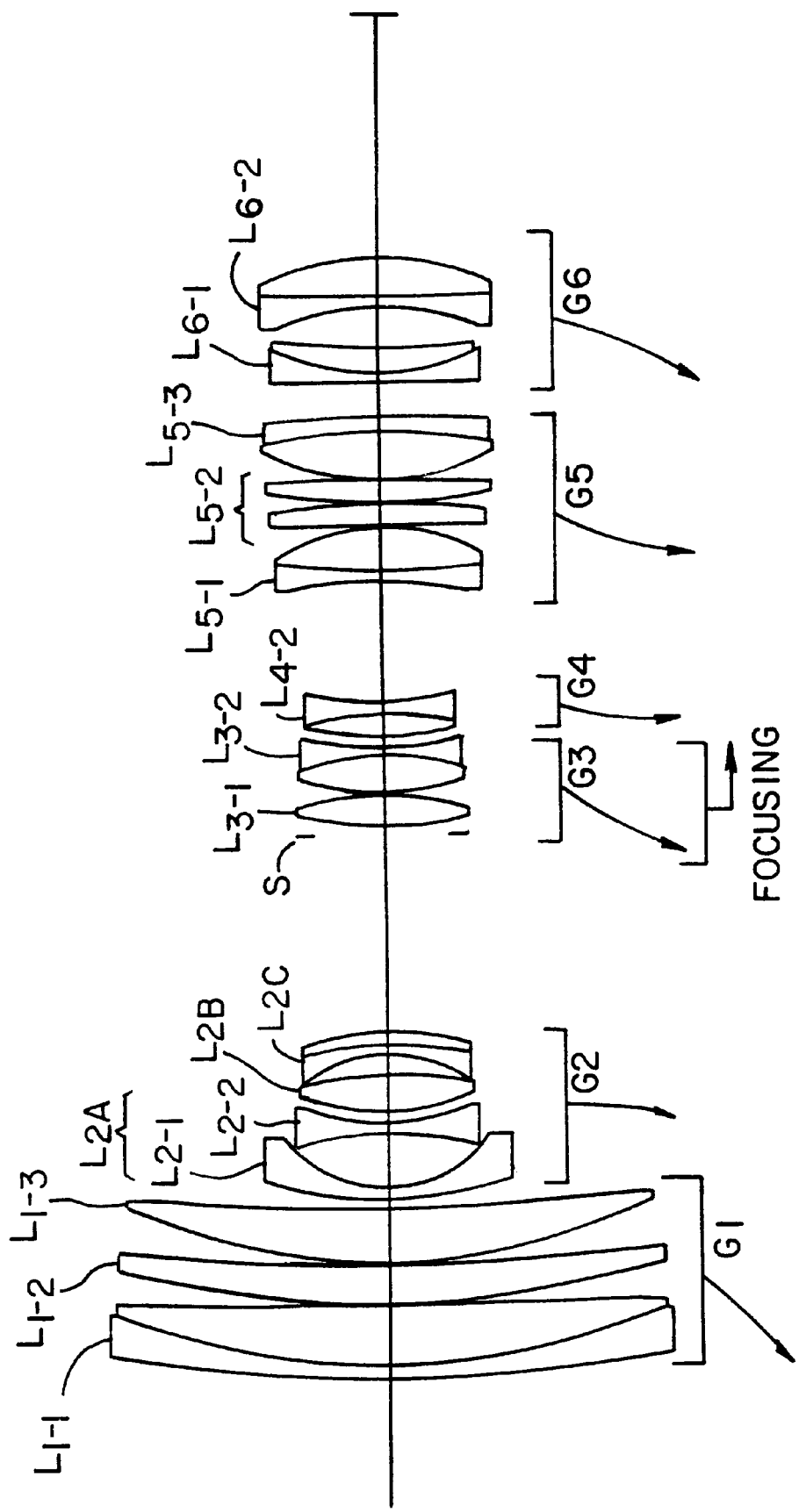
FIG. 21 is a diagram showing the configuration and lens motion loci of a fifth embodiment of the present invention.
Figure 22:
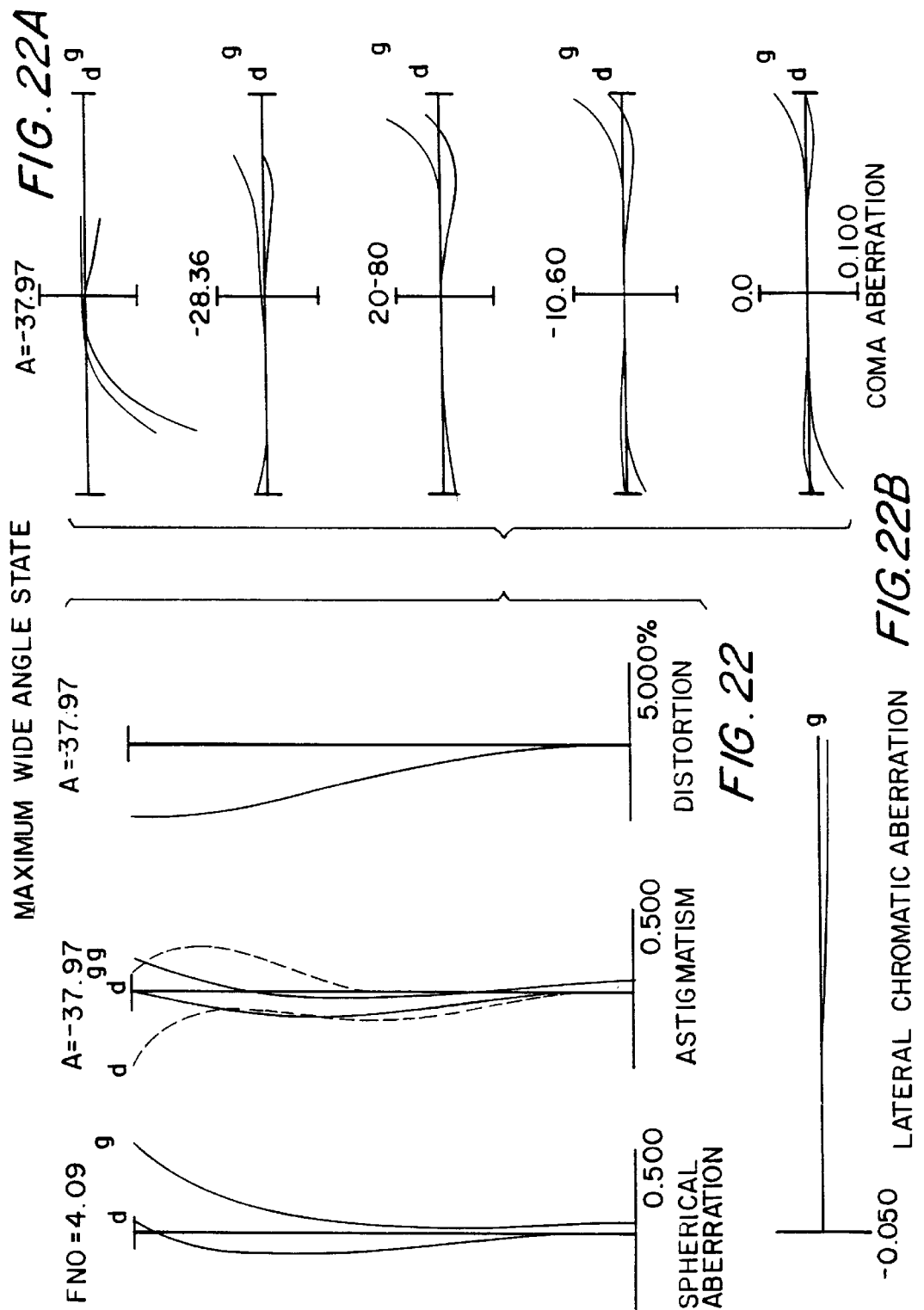
FIG. 22 shows plots of aberrations in the fifth embodiment, with the lens in the maximum wide-angle state and focused on infinity.
Figure 23:
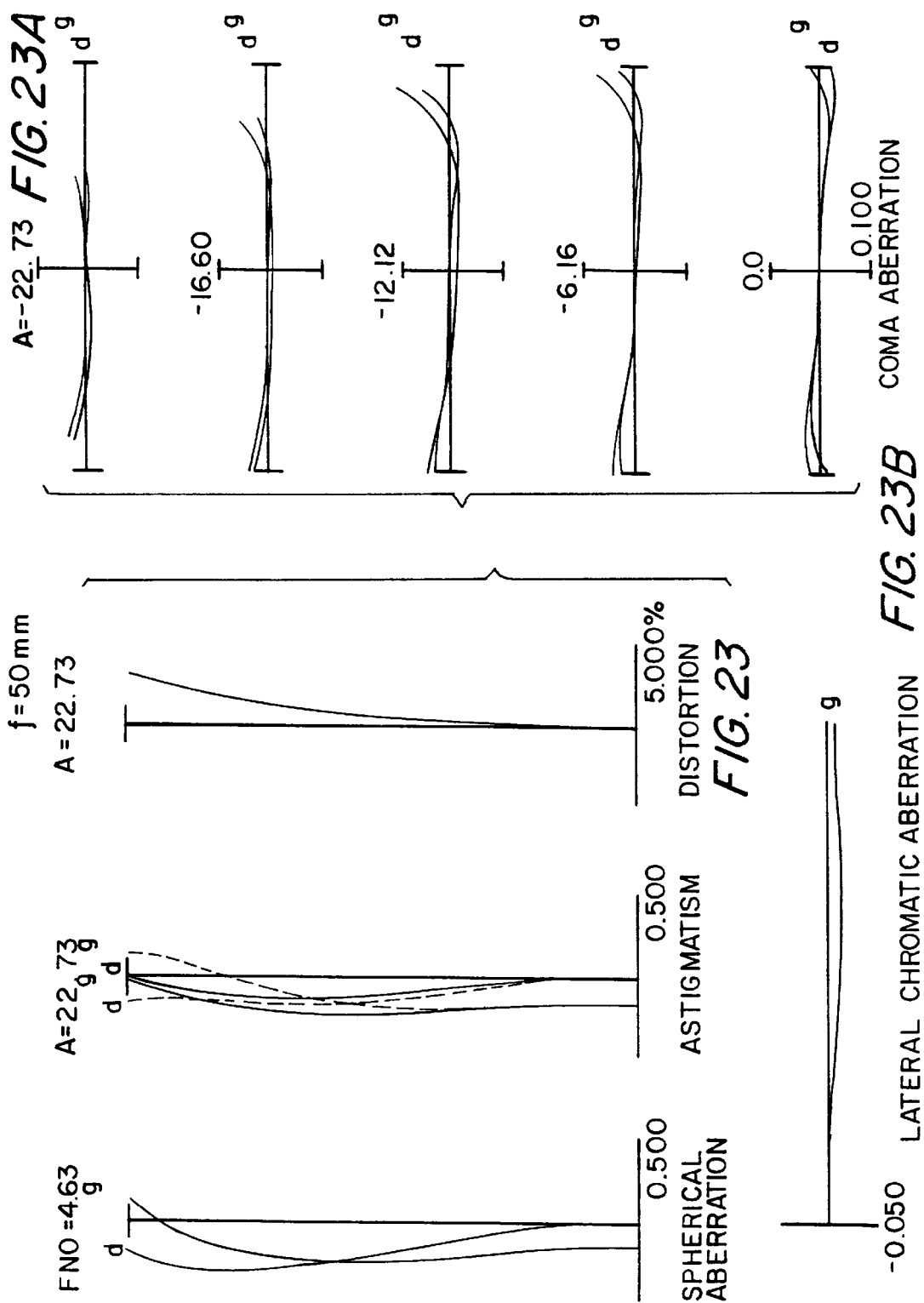
FIG. 23 shows plots of aberrations in the fifth embodiment, with the lens at an intermediate focal length (50 mm) and focused on infinity.
Figure 24:
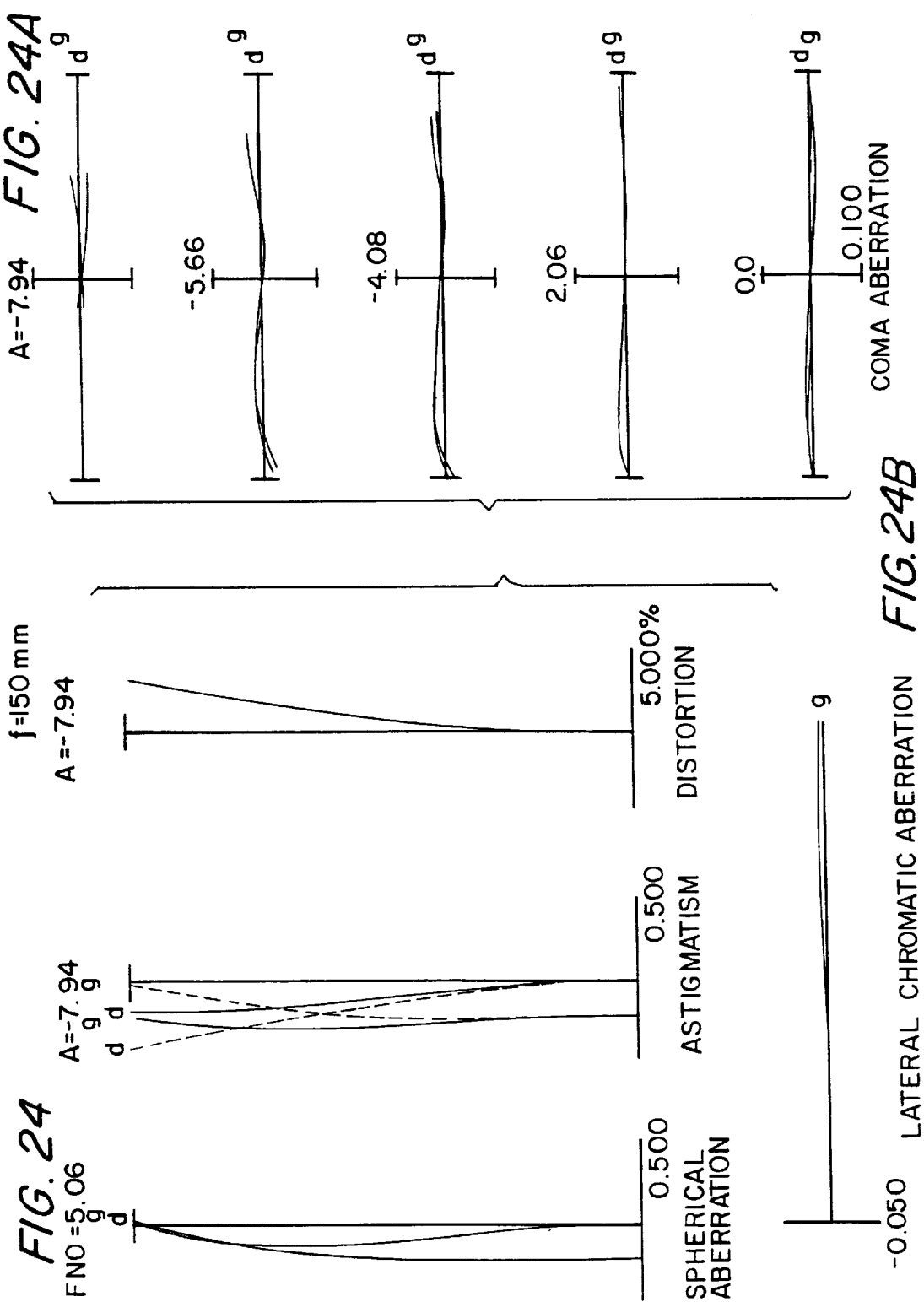
FIG. 24 shows plots of aberrations in the fifth embodiment, with the lens at an intermediate focal length (150 mm) and focused on infinity.
Figure 25:
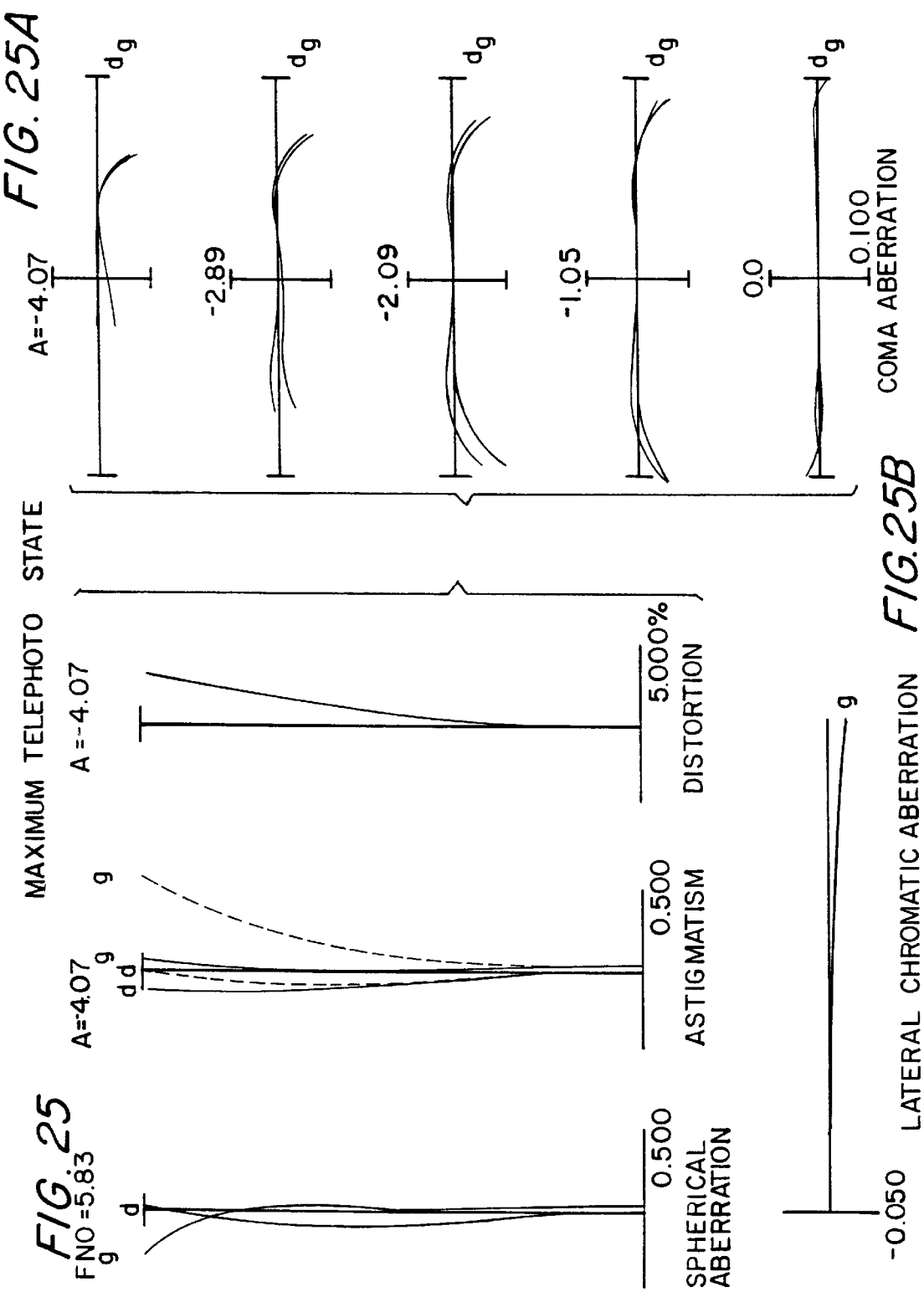
FIG. 25 shows plots of aberrations in the fifth embodiment, with the lens in the maximum telephoto state and focused on infinity.
Figure 26:
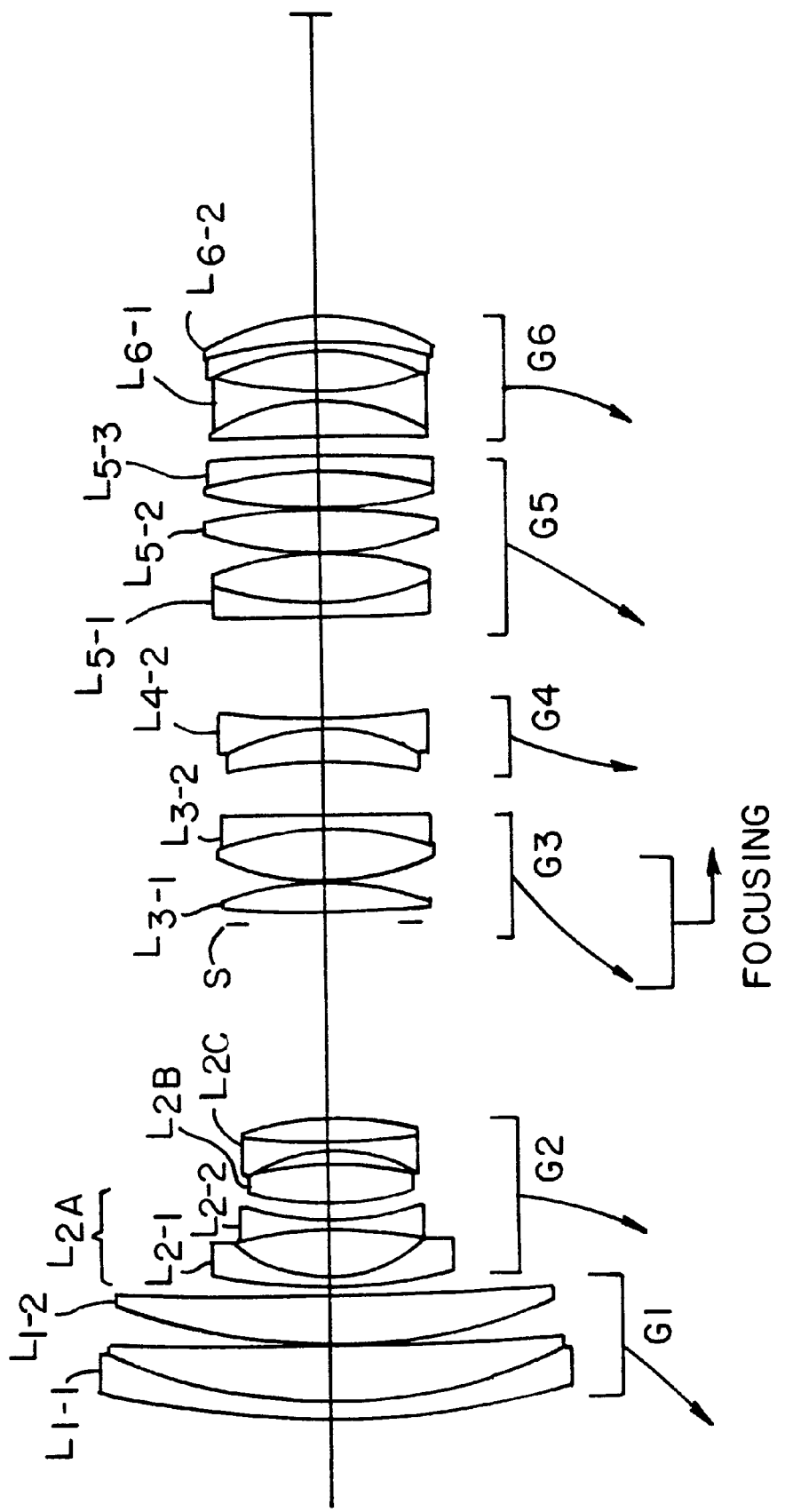
FIG. 26 is a diagram showing the configuration and lens motion loci of a sixth embodiment of the present invention.

Embodiments 4, 5, and 6, shown in FIGS. 16, 21, and 26, respectively, are made up of the following lens groups, listed in order, from the object side:

first lens group G1, which has positive refractive power, second lens group G2, which has negative refractive power, third lens group G3, which has positive refractive power, fourth lens group G4, which has negative refractive power, fifth lens group G5, which has positive refractive power, and sixth lens group G6, which has negative refractive power.

Zooming is performed by moving each lens group toward the object side of the zoom lens system such that the positional relationships between the lens groups change as follows:

the air-space separation between the first lens group G1 and the second lens group G2 is increased, the air-space separation between the second lens group G2 and the third lens group G3 is decreased, the air-space separation between the third lens group G3 and the fourth lens group G4 is increased, the air-space separation between the fourth lens group G4 and the fifth lens group G5 is decreased, and the air-space separation between the fifth lens group G5 and the sixth lens group G6 is increased at the intermediate focal length, and decreased as it moves further toward the maximum telephoto state.

Also, close-up focusing is performed by moving the third lens group G3 toward the image side of the system.

Embodiment 1

In the zoom lens of Embodiment 1, as shown in FIG. 1, the first lens group G1 comprises, in order, from the object side:

a cemented composite negative lens component L1-1, which is made up of
 a negative meniscus-shaped lens component with its convex surface facing the object side;
 a double-convex positive lens component with its strong (small radius of curvature) surface facing the object side; and
 a positive meniscus-shaped lens component L1-2 with its convex surface facing the object side.

The second lens group G2 comprises, in order, from the object end:

a negative meniscus-shaped lens component L2-1, with its convex surface facing the object side;

a double-concave negative lens component L2-2;

a double-convex positive lens component L2B; and a cemented composite lens component L2C, which is made up of:
 a negative meniscus-shaped lens component with its concave surface facing the object side; and
 a positive meniscus-shaped lens component with its concave surface facing the object end.

Within the second lens group G2:

the negative lens component L2-1 and the negative lens component L2-2 form a negative subgroup L2A of the second lens group G2;

the positive lens component L2B forms a positive subgroup L2B of the second lens group G2; and the cemented composite lens component L2C forms a negative subgroup L2C of the second lens group G2.

Also within the second lens group G2, the lens surface on the object side of the negative lens component L2-1 (the lens component placed nearest the object side of the second lens group G2) is an aspheric surface.

Third lens group G3 comprises, in order, from the object end:

a double-convex positive lens component L3-1, which has its strong surface facing the image side; and a compound lens component L3-2, which is made up of:
 a double-convex positive lens component with its strong surface facing the object side; and
 a double-concave negative lens component.

A fourth lens group G4 comprises, in order, from the object side:

a positive meniscus-shaped lens component L4-1, which has its concave surface facing the object side; and a negative meniscus-shaped lens component L4-2, which has its concave surface facing the object end.

A fifth lens group G5 comprises, in order, from the object end:

a cemented composite lens component L5-1, which is made up of:
 a double-concave negative lens component with its strong surface facing the image side; and
 a double-convex positive lens component;

a double-convex positive lens component L5-2;

a cemented composite lens component L5-3, which is made up of:
 a double-convex positive lens component; and
 a double-concave negative lens component with its strong surface facing the object side;

a negative meniscus-shaped lens component L5-4, which has its convex surface facing the object side; and a cemented composite lens component L5-5, which is made up of:
 a double-convex positive lens component with its strong surface facing the image side; and
 a negative meniscus-shaped lens component with its concave surface facing the object side.

In Embodiment 1, an aperture stop S is provided near the third lens group G3 (between the second lens group G2 and the third lens group G3). During zooming, the aperture stop S moves along with the third lens group G3 as one unit.

Embodiment 2

In the zoom lens of Embodiment 2, as shown in FIG. 6, the first lens group G1 comprises, in order, from the object side:

a cemented composite lens component L1-1, which is made up of:
 a negative meniscus-shaped lens component with its convex surface facing the object side; and
 a positive meniscus-shaped lens component with its convex surface facing the object side;

a positive meniscus-shaped lens component L1-2 with its convex surface facing the object side.

A second lens group G2 comprises, in order, from the object side:

a negative meniscus-shaped lens component L2-1, which has its convex surface facing the object side;

a double-concave negative lens component L2-2;

a double-convex positive lens component L2B; and a negative meniscus-shaped lens component L2C, which has its concave surface facing the object side.

Within the second lens group G2:

the negative lens component L2-1 and the negative lens component L2-2 form a negative subgroup L2A of the second lens group G2;

the positive lens component L2B forms a positive subgroup L2B of the second lens group G2; and the negative lens component L2C forms a negative subgroup L2C of the second lens group G2.

Also within the second lens group G2, the lens surface on the object side of the negative lens component L2-1 (the lens component placed nearest the object side of the second lens group G2) is an aspheric surface.

The third lens group G3 comprises, in order, from the object side:

a double-convex positive lens component L3-1, which has its strong surface facing the image side; and a cemented composite lens component L3-2, which is made up of:
a double-convex positive lens component, and
a double-concave negative lens component with its strong surface facing the object side.

A fourth lens group G4 comprises, in order, from the object side:

a positive meniscus-shaped lens component L4-1, which has its concave surface facing the object side; and a negative meniscus-shaped lens component L4-2, which has its concave surface facing the object side.

A fifth lens group G5 comprises, in order, from the object side:

a cemented composite lens component L5-1, which is made up of:
a double-concave negative lens component; and
a double-convex positive lens component with its strong surface facing the image side;

a double-convex positive lens component L5-2, which has its strong surface facing the object side;

a cemented composite lens component L5-3, which is made up of:
a double-convex positive lens component with its strong surface facing the image side; and
a double-concave negative lens component with its strong surface facing the object side;

a cemented composite lens component L5-4, which is made up of:
a double-concave negative lens component with its strong surface facing the image side; and
a double-convex positive lens component with its strong surface facing the object side; and a negative meniscus-shaped lens component L5-5, which has its concave surface facing the object side.

In Embodiment 2, an aperture stop S is provided near the third lens group G3 (between the second lens group G2 and the third lens group G3). During a zooming operation, the aperture stop S moves along with the third lens group G3 as one unit.

Embodiment 3

In the zoom lens of Embodiment 3, as shown in FIG. 11, the first lens group G1 comprises, in order, from the object side:

a cemented composite lens component L1-1, which is made up of:
a negative meniscus-shaped lens component with its convex surface facing the object side; and
a positive meniscus-shaped lens component with its convex surface facing the object side;
a positive meniscus-shaped lens component L1-2 with its convex surface facing the object side.

The second lens group G2 comprises, in order, from the object side:

a negative meniscus-shaped lens component L2-1, which has its convex surface facing the object side;

a double-concave negative lens component L2-2;

a double-convex positive lens component L2B; and a cemented composite lens component L2-C, which is made up of:
a negative meniscus-shaped lens component which has its concave surface facing the object side; and
a positive meniscus-shaped lens component which has its concave surface facing the object side.

Within the second lens group G2:

the negative lens component L2-1 and the negative lens component L2-2 form a negative subgroup L2A of the second lens group G2, the positive lens component L2B forms a positive subgroup L2B of the second lens group G2; and the cemented composite lens component L2C forms a negative subgroup L2C of the second lens group G2.

Also within the second lens group G2, the lens surface on the object side of the negative lens component L2-1 (the lens component placed nearest the object side in the second lens group G2) is an aspheric surface.

The third lens group G3 comprises, in order, from the object side:

a double-convex positive lens component L3-1, which has its strong surface facing the image side; and a cemented composite lens component L3-2, which is made up of:
a double-convex positive lens component; and
a double-concave negative lens component.

The fourth lens group G4 comprises, in order, from the object side:

a positive meniscus-shaped lens component L4-1, which has its concave surface facing the object side; and a negative meniscus-shaped lens component L4-2, which has its concave surface facing the object side.

The fifth lens group G5 comprises, in order, from the object side:

a cemented composite lens component L5-1, which is made up of:
a double-convex negative lens component with its strong surface facing the image side; and
a double-convex positive lens component;

a double-convex positive lens component L5-2;

a cemented composite lens component L5-3, which is made up of:
a double-convex positive lens component; and
a double-concave negative lens component;

a double-concave lens component L5-4, which has its strong surface facing the image side; and a cemented composite lens component L5-5, which is made up of:
a double-convex positive lens component with its strong surface facing the image side, and
a negative meniscus-shaped lens component which has its concave surface facing the object side.

In Embodiment 3, an aperture stop S is provided near the third lens group G3 (between the second lens group G2 and the third lens group G3). During a zooming operation, the aperture stop S moves along with the third lens group G3 as one unit.

Embodiment 4

In the zoom lens of Embodiment 4, as shown in FIG. 16, the first lens group G1 comprises, in order, from the object end:

a cemented composite lens component L1-1, which is made up of:
   a negative meniscus-shaped lens component with its convex surface facing the object side; and
   a positive meniscus-shaped lens component with its convex surface facing the object side;
a positive meniscus-shaped lens component L1-2 with its convex surface facing the object side.

The second lens group G2 comprises, in order, from the object side:

a negative meniscus-shaped lens component L2-1, which has its convex surface facing the object side;
a double-concave negative lens component L2-2;
a double-convex positive lens component L2B; and
a cemented composite lens component L2-C, which is made up of:
   a negative meniscus-shaped lens component which has its concave surface facing the object side, and
   a positive meniscus-shaped lens component which has its concave surface facing the object side.

Within the second lens group G2:
the negative lens component L2-1 and the negative lens component L2-2 form a negative subgroup L2A of the second lens group G2;
the positive lens component L2B forms a positive subgroup L2B of the second lens group G2; and
the cemented composite lens component L2C forms a negative subgroup L2C of the second lens group G2.

Also within the second lens group G2, the lens surface on the object side of the negative lens component L2-1 (the lens component placed nearest the object side in second lens group G2) is an aspheric surface.

The third lens group G3 comprises, in order, from the object side:

a double-convex positive lens component L3-1, which has its strong surface facing the image side; and
a cemented composite lens component L3-2, which is made up of:
   a double-convex positive lens component; and
   a negative meniscus-shaped lens component with its concave surface facing the object side.

The fourth lens group G4 comprises, in order, from the object side:

a positive meniscus-shaped lens component L4-1, which has its concave surface facing the object side; and
a double-concave negative lens component L4-2, which has its strong surface facing the object side.

The fifth lens group G5 comprises, in order, from the object side:

a cemented composite lens component L5-1, which is made up of:
   a double-concave negative lens component with its strong surface facing the image side; and
   a double-convex positive lens component;
a double-convex positive lens component L5-2; and
a cemented composite lens component L5-3, which is made up of:
   a double-convex positive lens component, and
   a negative meniscus-shaped lens component with its concave surface facing the object side.

The sixth lens group G6 comprises, in order, from the object side:

a negative meniscus-shaped lens component L6-1, which has its convex surface facing the object side; and
a cemented composite lens component L6-2, which is made up of:
   a positive meniscus-shaped lens component with its concave surface facing the object side; and
   a negative meniscus-shaped lens component with its concave surface facing the object side.

In Embodiment 4, an aperture stop S is provided near the third lens group G3 (between the second lens group G2 and the third lens group G3). During a zooming operation, the aperture stop S moves along with the third lens group G3 as one unit.

Embodiment 5

In the zoom lens of Embodiment 5, as shown in FIG. 21, first lens group G1 comprises, in order, from the object side:

a cemented composite lens component L1-1, which is made up of:
   a negative meniscus-shaped lens component with its convex surface facing the object side; and
   a positive meniscus-shaped lens component with its convex surface facing the object side;
a positive meniscus-shaped lens component L1-2 with its convex surface facing the object side; and
a positive meniscus-shaped lens component L1-3, which has its convex surface facing the object side.

The second lens group G2 comprises, in order, from the object side:

a negative meniscus-shaped lens component L2-1, which has its convex surface facing the object side;
a double-concave negative lens component L2-2;
a double-convex positive lens component L2B; and
a cemented composite lens component L2-C, which is made up of:
   a negative meniscus-shaped lens component which has its concave surface facing the object side; and
   a positive meniscus-shaped lens component which has its concave surface facing the object side.

Within the second lens group G2:
the negative lens component L2-1 and the negative lens component L2-2 form a negative subgroup L2A of the second lens group G2;
the positive lens component L2B forms a positive subgroup L2B of the second lens group G2; and
the cemented composite lens component L2C forms a negative subgroup L2C of the second lens group G2.

Also within the second lens group G2, the lens surface on the object side of the negative lens component L2-1 (the lens component placed nearest the object side) is an aspheric surface.

The third lens group G3 comprises, in order, from the object side:

a double-convex positive lens component L3-1; and
a cemented composite lens component L3-2, which is made up of:
   a double-convex positive lens component, and
   a double-concave negative lens component.

The fourth lens group G4 has a compound lens component L4-2, which comprises, in order from the object side:

a double-convex positive lens component; and a double-concave negative lens component with its strong surface facing the image side.

The fifth lens group G5 comprises, in order, from the object end:

a cemented composite lens component L5-1, which is made up of:
a double-concave negative lens component, and
a double-convex positive lens component with its strong surface facing the image side; and a cemented composite lens component L5-3, which is made up of:
a double-convex positive lens component with its strong surface facing the object side; and
a negative meniscus-shaped lens component with its concave surface facing the object side.

The sixth lens group G6 comprises, in order, from the object side:

a compound lens component L6-1, which is made up of:
a negative meniscus-shaped lens component with its concave surface facing the image side, and
a positive meniscus-shaped lens component with its convex surface facing the object side; and a cemented composite lens component L6-2, which is made up of:
a double-concave negative lens component with its strong surface facing the object side, and
a double-convex positive lens component with its strong surface facing the image side.

In Embodiment 5, an aperture stop S is placed near the third lens group G3 (between the second lens group G2 and the third lens group G3). During a zooming operation, the aperture stop S moves along with the third lens group G3 as one unit.

Embodiment 6

In the zoom lens of Embodiment 6, as shown in FIG. 26, the first lens group G1 comprises, in order, from the object side:

a cemented composite lens component L1-1, which is made up of:
a negative meniscus-shaped lens component with its convex surface facing the object side, and
a positive meniscus-shaped lens component with its convex surface facing the object side; and a positive meniscus-shaped lens component L1-2 with its convex surface facing the object side.

The second lens group G2 comprises, in order, from the object side:

a negative meniscus-shaped lens component L2-1, which has its convex surface facing the object side;

a double-concave negative lens component L2-2;

a double-convex positive lens component L2B; and a cemented composite lens component L2-C, which is made up of:
a double-concave negative lens component with its strong surface facing the object side, and
a double-convex positive lens component.

Within the second lens group G2:

the negative lens component L2-1 and the negative lens component L2-2 form a negative subgroup L2A of the second lens group G2;

the positive lens component L2B forms a positive subgroup L2B of the second lens group G2; and the cemented composite lens component L2C forms a negative subgroup L2C of the second lens group G2.

Also within the second lens group G2, the lens surface on the object side of the negative lens component L2-1 (the lens component placed nearest the object side in the second lens group G2) is an aspheric surface.

The third lens group G3 comprises, in order, from the object side:

a double-convex positive lens component L3-1, which has its strong surface facing the image side; and a cemented composite lens component L3-2, which is made up of:
a double-convex positive lens component; and
a negative meniscus-shaped lens component with its concave surface facing the object side.

The fourth lens group G4 has a compound lens component L4-2, which comprises, in order, from the object side:

a positive meniscus-shaped lens component with its concave surface facing the object side; and a double-concave negative lens component with its strong surface facing the object side.

The fifth lens group G5 comprises, in order, from the object side:

a cemented composite lens component L5-1, which is made up of:
a negative meniscus-shaped lens component with its concave surface facing the image side; and
a double-convex positive lens component;

a double-convex positive lens component L5-2; and a cemented composite lens component L5-3, which is made up of:
a double-convex positive lens component; and
a negative meniscus-shaped lens component with its concave surface facing the object side.

The sixth lens group G6 comprises, in order, from the object side:

a cemented composite lens component L6-1, which is made up of:
a positive meniscus-shaped lens component with its convex surface facing the image side, and
a double-concave negative lens component with its strong surface facing the object side.

a cemented composite lens component L6-2, which is made up of:
a negative meniscus-shaped lens component with its concave surface facing the object side, and
a positive meniscus-shaped lens component with its concave surface facing the object side.

In Embodiment 6, an aperture stop S is placed near the third lens group G3 (between the second lens group G2 and the third lens group G3). During a zooming operation, the aperture stop S moves along with the third lens group G3 as one unit.

Various data for Embodiments 1 through 6 are provided below in Tables 1 through 6, respectively, wherein $r_i$ is the radius of curvature of a lens surface $R_i$, $d_{i+1}$ is the surface separation along the optical axis between a lens surface $R_i$ and a lens surface $R_{i+1}$, $n_i$ is the d-line index of refraction between a lens surface $R_i$ and a lens surface $R_{i+1}$, $\nu(d)_i$ is the Abbe number between a lens surface $R_i$ and a lens surface $R_{i+1}$, f is the focal length, FNo is the F-number, 2ω is the field angle, and Bf is back-focus.

In the tables, an aspheric surface is indicated by an asterisk (*), and the values entered in the "r" column are near-axis radii of curvature.

This aspheric surface is given by the aspheric surface equation (1) provided below, where S(y) is the distance along the optical axis from a plane tangent to the apex of each aspheric surface at a height y in a direction perpendicular to the optical axis, R is the reference radius of curvature, κ is the conic constant, and Cn is the nth-order aspheric coefficient.

$$S(y) = (y^2/R)/\{1 + (1 - \kappa \cdot y^2/R^2)^{1/2}\} +$$
$$C3 \cdot |y|^3 + C4 \cdot y^4 + C5 \cdot |y|^5 + C6 \cdot y^6 +$$
$$C7 \cdot |y|^7 + C8 \cdot y^8 + C10 \cdot y^{10}$$

Equation 1

Also, in the aspheric surface data listed in the tables, "E–n" means "×10$^{-n}$.".

TABLE 1

Embodiment 1 f = 29–294
FNo = 3.58–5.89
2ω = 76.32°–8.24°

| | r | d | ν(d) | n(d) | |
|---|---|---|---|---|---|
| 1. | 139.8843 | 2.0000 | 28.56 | 1.795040 | |
| 2. | 91.2995 | 9.5000 | 82.52 | 1.497820 | |
| 3. | −982.2627 | 0.1000 | | 1.000000 | |
| 4. | 92.0493 | 6.0000 | 82.52 | 1.497820 | |
| 5. | 263.9914 | (D5) | | 1.000000 | |
| *6. | 101.9402 | 1.7000 | 49.45 | 1.772789 | |
| 7. | 19.6800 | 8.5000 | | 1.000000 | |
| 8. | −53.5257 | 1.5000 | 49.45 | 1.772789 | |
| 9. | 58.7490 | 1.4884 | | 1.000000 | |
| 10. | 40.2792 | 6.0000 | 27.83 | 1.699110 | |
| 11. | −48.0900 | 2.0000 | | 1.000000 | |
| 12. | −23.0675 | 1.4000 | 43.35 | 1.840421 | |
| 13. | −160.8603 | 2.3000 | 27.83 | 1.699110 | |
| 14. | −46.5170 | (D14) | | 1.000000 | |
| 15. | ∞ | 2.0000 | | 1.000000 | (Aperture Stop S) |
| 16. | 122.5654 | 4.5000 | 64.10 | 1.516800 | |
| 17. | −46.8045 | 0.1000 | | 1.000000 | |
| 18. | 39.7988 | 5.0000 | 64.10 | 1.516800 | |
| 19. | −139.5693 | 1.7000 | 37.20 | 1.834000 | |
| 20. | 111.2973 | (D20) | | 1.000000 | |
| 21. | −70.9038 | 3.0000 | 33.75 | 1.648311 | |
| 22. | −45.0864 | 1.2000 | | 1.000000 | |
| 23. | −31.5132 | 1.6000 | 65.42 | 1.603001 | |
| 24. | −145.9646 | (D24) | | 1.000000 | |
| 25. | −229.3568 | 1.8000 | 37.20 | 1.834000 | |
| 26. | 53.2216 | 8.0000 | 70.41 | 1.487490 | |
| 27. | −45.3031 | 0.1000 | | 1.000000 | |
| 28. | 42.6916 | 9.7111 | 60.64 | 1.603110 | |
| 29. | −64.9650 | 0.1000 | | 1.000000 | |
| 30. | 81.5036 | 7.5000 | 70.41 | 1.487490 | |
| 31. | −44.4898 | 2.0000 | 37.20 | 1.834000 | |
| 32. | 115.7508 | 5.9348 | | 1.000000 | |
| 33. | 347.2845 | 1.8000 | 43.35 | 1.840421 | |
| 34. | 60.1686 | 1.0000 | | 1.000000 | |
| 35. | 84.9850 | 11.0000 | 33.75 | 1.648311 | |
| 36. | −22.4971 | 1.7000 | 43.35 | 1.840421 | |
| 37. | −114.4714 | (Bf) | | 1.000000 | |

Aspherical Surface Data for Embodiment 1
Surface #6

κ = 5.5923
C3 = 0.42348E15
C4 = 0.23254E-05
C6 = -0.45243E-08
C7 = -0.70334E-10
C8 = -0.36054E-11

TABLE 1-continued

Embodiment 1

C5 = 0.20608E-06    C10 = 0.36526E-13

Variable Surface Separation Data for Embodiment 1

| f | 29.00000 | 50.00000 | 150.00000 | 294.00000 |
|---|---|---|---|---|
| D0 | 0.00000 | 0.00000 | 0.00000 | 0.00000 |
| D5 | 0.75222 | 20.30380 | 67.81332 | 92.91723 |
| D14 | 32.62236 | 19.39953 | 7.81089 | 1.59250 |
| D20 | 10.75991 | 11.86056 | 19.73793 | 25.37919 |
| D24 | 16.02696 | 11.89951 | 3.66897 | 1.00898 |
| Bf | 47.69920 | 71.91354 | 114.45346 | 119.86524 |
| β | −0.03333 | −0.03333 | −0.03333 | −0.03333 |
| D0 | 818.60720 | 1414.23460 | 4213.69250 | 8163.89890 |
| D5 | 0.75222 | 20.30380 | 67.81322 | 92.91723 |
| D14 | 33.53120 | 20.03069 | 8.51855 | 2.81633 |
| D20 | 9.85107 | 11.22940 | 19.03027 | 24.15536 |
| D24 | 16.02696 | 11.89951 | 3.66897 | 1.00898 |
| Bf | 47.69920 | 71.91354 | 114.45346 | 119.86524 |
| β | −0.06723 | −0.07266 | −0.12924 | −0.15448 |
| D0 | 379.90510 | 602.38880 | 874.28130 | 1247.00260 |
| D5 | 0.75222 | 20.30380 | 67.81322 | 92.91723 |
| D14 | 34.47272 | 20.77892 | 10.55650 | 7.27150 |
| D20 | 8.90955 | 10.48117 | 16.99232 | 19.70019 |
| D24 | 16.02696 | 11.89951 | 3.66897 | 1.00898 |
| Bf | 47.69920 | 71.91354 | 114.45346 | 119.86524 |

TABLE 2

Embodiment 2 f = 29–294
FNo = 3.63–5.77
2ω = 76°–8.24°

| | r | d | ν(d) | n(d) | |
|---|---|---|---|---|---|
| 1. | 132.4066 | 210000 | 37.20 | 1.834000 | |
| 2. | 77.5451 | 9.0000 | 82.52 | 1.497820 | |
| 3. | 854.3724 | 0.1000 | | 1.000000 | |
| 4. | 89.0680 | 7.5000 | 82.52 | 1.497820 | |
| 5. | 1038.6458 | (D5) | | 1.000000 | |
| *6. | 66.7926 | 1.7000 | 49.45 | 1.772789 | |
| 7. | 19.3055 | 8.5000 | | 1.000000 | |
| 8. | −41.6467 | 1.5000 | 49.45 | 1.772789 | |
| 9. | 53.4618 | 3.6482 | | 1.000000 | |
| 10. | 45.1490 | 6.5000 | 27.83 | 1.699110 | |
| 11. | −32.3220 | 1.2000 | | 1.000000 | |
| 12. | −24.9910 | 1.4000 | 43.35 | 1.840421 | |
| 13. | −90.6965 | (D13) | | 1.000000 | |
| 14. | ∞ | 2.0000 | | 1.000000 | (Aperture Stop S) |
| 15. | 65.1652 | 5.5000 | 64.10 | 1.516800 | |
| 16. | −50.0773 | 0.1000 | | 1.000000 | |
| 17. | 58.2695 | 6.0000 | 70.41 | 1.487490 | |
| 18. | −46.0907 | 1.7000 | 37.20 | 1.834000 | |
| 19. | 3645.4902 | (D19) | | 1.000000 | |
| 20. | −63.5089 | 3.0000 | 33.75 | 1.648311 | |
| 21. | −36.5188 | 0.8000 | | 1.000000 | |
| 22. | −30.6473 | 1.6000 | 65.42 | 1.603001 | |
| 23. | −255.2228 | (D23) | | 1.000000 | |
| 24. | −104.9337 | 1.8000 | 37.20 | 1.834000 | |
| 25. | 74.2827 | 7.0000 | 70.41 | 1.487490 | |
| 26. | −34.4285 | 0.1000 | | 1.000000 | |
| 27. | 36.2477 | 8.5000 | 58.50 | 1.651599 | |
| 28. | −79.3479 | 0.1000 | | 1.000000 | |
| 29. | 94.9143 | 7.0000 | 70.41 | 1.487490 | |
| 30. | −39.0224 | 2.0000 | 37.20 | 1.834000 | |
| 31. | 296.9761 | 2.0000 | | 1.000000 | |
| 32. | −122.9844 | 1.7000 | 43.35 | 1.840421 | |
| 33. | 23.3521 | 9.0000 | 33.75 | 1.648311 | |
| 34. | −90.9369 | 2.5000 | | 1.000000 | |
| 35. | −36.5081 | 2.5000 | 45.37 | 1.796681 | |
| 36. | −49.2418 | (Bf) | | 1.000000 | |

Aspherical Surface Data for Embodiment 2

TABLE 2-continued

Embodiment 2

Surface #6

| | |
|---|---|
| κ = 3.1155 | C6 = −0.62980E-09 |
| C3 = 0.11275E-05 | C7 = −0.13207E-09 |
| C4 = 0.10944E-05 | C8 = −0.72066E-11 |
| C5 = 0.14691E-06 | C10 = 0.47008E-13 |

Variable Surface Separation Data for Embodiment 2

| f | 29.00000 | 50.00000 | 150.00000 | 294.00000 |
|---|---|---|---|---|
| D0 | 0.00000 | 0.00000 | 0.00000 | 0.00000 |
| D5 | 0.76465 | 19.63255 | 67.95868 | 93.09529 |
| D13 | 32.30941 | 18.92869 | 7.68513 | 1.15708 |
| D19 | 9.97212 | 11.34392 | 20.61456 | 24.60172 |
| D23 | 17.82244 | 13.70705 | 5.05152 | 3.19284 |
| Bf | 50.49823 | 75.19054 | 116.48131 | 122.31625 |
| β | −0.03333 | −0.03333 | −0.03333 | −0.03333 |
| D0 | 817.65970 | 1414.95360 | 4211.47130 | 8158.61650 |
| D5 | 0.76465 | 19.63255 | 67.95868 | 93.09529 |
| D13 | 33.21825 | 19.55067 | 8.39636 | 2.39455 |
| D19 | 9.06328 | 10.72194 | 19.90332 | 23.36425 |
| D23 | 17.82244 | 13.70705 | 5.05152 | 3.19284 |
| Bf | 50.49823 | 75.19054 | 116.48131 | 122.31625 |

TABLE 3

Embodiment 3 f = 29–294
FNo = 3.60–5.71
2ω = 76°–8.26°

| | r | d | ν(d) | n(d) | |
|---|---|---|---|---|---|
| 1. | 133.2866 | 2.0000 | 37.20 | 1.834000 | |
| 2. | 77.6222 | 9.0000 | 82.52 | 1.497820 | |
| 3. | 874.2148 | 0.1000 | | 1.000000 | |
| 4. | 89.2363 | 7.5000 | 82.52 | 1.497820 | |
| 5. | 1121.9882 | (D5) | | 1.000000 | |
| *6. | 80.0480 | 1.7000 | 49.45 | 1.772789 | |
| 7. | 19.9619 | 8.5000 | | 1.000000 | |
| 8. | −48.5813 | 1.5000 | 49.45 | 1.772789 | |
| 9. | 53.2226 | 2.6311 | | 1.000000 | |
| 10. | 42.4853 | 6.0000 | 27.83 | 1.699110 | |
| 11. | −36.8847 | 1.2000 | | 1.000000 | |
| 12. | −24.9674 | 1.4000 | 43.35 | 1.840421 | |
| 13. | −195.7426 | 2.0000 | 27.83 | 1.699110 | |
| 14. | −77.0037 | (D4) | | 1.000000 | |
| 15. | ∞ | 2.0000 | | 1.000000 | (Aperture Stop S) |
| 16. | 166.9274 | 4.5000 | 64.10 | 1.516800 | |
| 17. | −46.5029 | 0.1000 | | 1.000000 | |
| 18. | 39.1880 | 5.5000 | 70.41 | 1.487490 | |
| 19. | −72.7124 | 1.7000 | 37.20 | 1.834000 | |
| 20. | 260.1685 | (D20) | | 1.000000 | |
| 21. | −59.2193 | 3.0000 | 33.75 | 1.648311 | |
| 22. | −37.6253 | 0.5000 | | 1.000000 | |
| 23. | −31.8723 | 1.6000 | 65.42 | 1.603001 | |
| 24. | −207.9433 | (D24) | | 1.000000 | |
| 25. | −322.6723 | 1.8000 | 37.20 | 1.834000 | |
| 26. | 56.5865 | 7.0000 | 70.41 | 1.487490 | |
| 27. | −41.5345 | 0.1000 | | 1.000000 | |
| 28. | 42.6552 | 8.0000 | 60.64 | 1.603110 | |
| 29. | −69.8327 | 0.1000 | | 1.000000 | |
| 30. | 73.8394 | 7.0000 | 70.41 | 1.487490 | |
| 31. | −49.7852 | 2.0000 | 37.20 | 1.834000 | |
| 32. | 330.3786 | 2.0000 | | 1.000000 | |
| 33. | −186.4539 | 1.8000 | 43.35 | 1.840421 | |
| 34. | 71.9768 | 5.0000 | | 1.000000 | |
| 35. | 220.6859 | 9.0000 | 33.75 | 1.648311 | |
| 36. | −23.5808 | 1.7000 | 43.35 | 1.840421 | |
| 37. | −103.6532 | (Bf) | | 1.000000 | |

Aspherical Surface Data for Embodiment 3
Surface #6

TABLE 3-continued

| | |
|---|---|
| κ = 4.3100 | C6 = 0.59634E-09 |
| C3 = 0.26566E-05 | C7 = −0.12483E-09 |
| C4 = 0.12680E-05 | C8 = −0.10046E-10 |
| C5 = 1.5633E-06 | C10 = 0.47232E-13 |

Variable Surface Separation Data for Embodiment 3

| f | 29.00000 | 50.00000 | 150.00000 | 294.00000 |
|---|---|---|---|---|
| D0 | 0.00000 | 0.00000 | 0.00000 | 0.00000 |
| D5 | 0.77720 | 19.64510 | 67.97123 | 93.10784 |
| D14 | 32.21311 | 18.83239 | 7.58883 | 1.06078 |
| D20 | 12.05045 | 13.42225 | 22.69289 | 26.68005 |
| D24 | 16.78082 | 12.66543 | 4.00990 | 2.15122 |
| Bf | 48.70476 | 73.39708 | 114.68785 | 120.52279 |
| β | −0.03333 | −0.03333 | −0.03333 | −0.03333 |
| D0 | 817.58870 | 1414.88210 | 4211.35660 | 8158.54630 |
| D5 | 0.77720 | 19.64510 | 67.97123 | 93.10784 |
| D14 | 33.12195 | 19.45437 | 8.30007 | 2.29825 |
| D20 | 11.14161 | 12.80027 | 21.98165 | 25.44258 |
| D24 | 16.78082 | 12.66543 | 4.00990 | 2.15122 |
| Bf | 48.70476 | 73.39708 | 114.68785 | 120.52279 |

TABLE 4

Embodiment 4 f = 29–294
FNo = 3.58–5.89
2ω = 76.32°–8.24°

| | r | d | ν(d) | n(d) | |
|---|---|---|---|---|---|
| 1. | 129.7932 | 2.0000 | 37.20 | 1.834000 | |
| 2. | 76.5215 | 8.8000 | 82.52 | 1.497820 | |
| 3. | 577.2770 | 0.1000 | | 1.000000 | |
| 4. | 83.9508 | 7.8000 | 82.52 | 1.497820 | |
| 5. | 807.6217 | (D5) | | 1.000000 | |
| *6. | 95.7255 | 1.7000 | 49.45 | 1.772789 | |
| 7. | 19.1058 | 10.8312 | | 1.000000 | |
| 8. | −43.1361 | 1.5000 | 49.45 | 1.772789 | |
| 9. | 60.8648 | 1.0000 | | 1.000000 | |
| 10. | 43.3243 | 5.8000 | 27.83 | 1.699110 | |
| 11. | −37.6453 | 1.2000 | | 1.00000 | |
| 12. | −25.6582 | 1.4000 | 43.35 | 1.840421 | |
| 13. | −189.1070 | 2.0000 | 27.83 | 1.699110 | |
| 14. | −55.2533 | (D14) | | 1.000000 | |
| 15. | ∞ | 2.0000 | | 1.000000 | (Aperture Stop S) |
| 16. | 325.0884 | 5.0000 | 70.41 | 1.487490 | |
| 17. | −44.3641 | 0.1000 | | 1.000000 | |
| 18. | 37.4722 | 9.2000 | 70.41 | 1.487490 | |
| 19. | −37.4722 | 1.7000 | 37.20 | 1.834000 | |
| 20. | −390.7522 | (D20) | | 1.000000 | |
| 21. | −66.3564 | 3.8000 | 33.75 | 1.648311 | |
| 22. | −34.9200 | 2.5000 | | 1.000000 | |
| 23. | −34.8062 | 1.6000 | 65.42 | 1.603001 | |
| 24. | 399.5574 | (D24) | | 1.000000 | |
| 25. | −387.8528 | 1.8000 | 37.20 | 1.834000 | |
| 26. | 52.9217 | 7.0000 | 70.41 | 1.487490 | |
| 27. | −52.9217 | 0.1000 | | 1.000000 | |
| 28. | 65.0568 | 6.5000 | 60.64 | 1.603110 | |
| 29. | −65.0568 | 0.1000 | | 1.000000 | |
| 30. | 52.4327 | 7.5000 | 70.41 | 1.487490 | |
| 31. | −52.4327 | 2.0000 | 37.20 | 1.834000 | |
| 32. | −196.1241 | (D32) | | 1.000000 | |
| 33. | 391.8408 | 1.8000 | 45.37 | 1.796681 | |
| 34. | 49.9188 | 6.0000 | | 1.000000 | |
| 35. | −103.3138 | 6.5000 | 33.75 | 1.648311 | |
| 36. | −25.5877 | 1.7000 | 45.37 | 1.796681 | |
| 37. | −76.8143 | (Bf) | | 1.000000 | |

Aspherical Surface Data for Embodiment 4
Surface #6

| | |
|---|---|
| κ = 6.6392 | C6 = −0.27156E-08 |
| C3 = 0.11693E-05 | C7 = −0.18851E-09 |
| C4 = 0.23646E-05 | C8 = −0.54996E-12 |
| C5 = 0.11611E-06 | C10 = 0.21000E-13 |

TABLE 4-continued

Variable Surface Separation Data for Embodiment 4

| f   | 29.00000  | 50.00000  | 150.00000 | 294.00000 |
|-----|-----------|-----------|-----------|-----------|
| D0  | 0.00000O  | 0.00000   | 0.00000   | 0.00000   |
| D5  | 0.61899   | 20.05467  | 69.69290  | 90.02974  |
| D14 | 31.07668  | 17.34213  | 2.46035   | 1.27310   |
| D20 | 4.79787   | 6.09358   | 5.78464   | 19.69966  |
| D24 | 16.98256  | 12.57714  | 11.06194  | 2.08077   |
| D32 | 2.99619   | 3.55277   | 5.17212   | 0.98658   |
| Bf  | 50.33526  | 73.10152  | 111.31263 | 141.75561 |
| β   | −0.03333  | −0.03333  | −0.03333  | −0.03333  |
| D0  | 817.96340 | 1414.07280| 4200.89190| 8131.44720|
| D5  | 0.61899   | 20.05467  | 69.69290  | 90.02974  |
| D14 | 31.98552  | 17.96956  | 3.22394   | 2.29892   |
| D20 | 3.88903   | 5.46615   | 5.02106   | 18.67384  |
| D24 | 16.98256  | 12.57714  | 11.06194  | 2.08077   |
| D32 | 2.99619   | 3.55277   | 5.17212   | 0.98658   |
| Bf  | 50.33526  | 73.10152  | 111.31263 | 141.75561 |
| β   | 0.06678   | 0.07223   | 0.10117   | −0.13233  |
| D0  | 382.16130 | 606.24700 | 1183.48430| 1633.14260|
| D5  | 0.61899   | 20.05467  | 69.69290  | 90.02974  |
| D14 | 32.91446  | 18.70511  | 4.77438   | 5.34949   |
| D20 | 2.96009   | 4.73060   | 3.47061   | 15.62327  |
| D24 | 16.98256  | 12.57714  | 11.06194  | 2.08077   |
| D32 | 2.99619   | 3.55277   | 5.17212   | 0.98658   |
| Bf  | 50.33526  | 77.10152  | 111.31263 | 141.75561 |

TABLE 5

Embodiment 5
f = 29–294
FNo = 4.09–5.83
2ω = 76°–8.14°

|     | r           | d       | υ(d)  | n(d)     |
|-----|-------------|---------|-------|----------|
| 1.  | 274.9299    | 2.0000  | 37.20 | 1.834000 |
| 2.  | 116.4844    | 10.0000 | 82.52 | 1.497820 |
| 3.  | 3239.4373   | 0.1000  |       | 1.000000 |
| 4.  | 155.7040    | 6.5000  | 82.52 | 1.497820 |
| 5.  | 561.5546    | 0.1000  |       | 1.000000 |
| 6.  | 97.3897     | 9.0000  | 82.52 | 1.497820 |
| 7.  | 528.3524    | (D7)    |       | 1.000000 |
| *8. | 80.9544     | 1.8000  | 43.35 | 1.840421 |
| 9.  | 19.9359     | 9.0000  |       | 1.000000 |
| 10. | −50.9656    | 1.7000  | 43.35 | 1.840421 |
| 11. | 38.3970     | 1.9319  |       | 1.000000 |
| 12. | 37.1924     | 6.0000  | 28.19 | 1.740000 |
| 13. | −51.1856    | 2.7000  |       | 1.000000 |
| 14. | −22.9239    | 1.6000  | 43.35 | 1.840421 |
| 15. | −58.7052    | 2.5000  | 25.50 | 1.804581 |
| 16. | −35.6057    | (D16)   |       | 1.000000 |
| 17. | ∞           | 1.1000  |       | 1.000000 (Aperture Stop S) |
| 18. | 52.5071     | 5.0000  | 64.10 | 1.516800 |
| 19. | −50.3699    | 0.1500  |       | 1.000000 |
| 20. | 32.7490     | 6.5000  | 64.10 | 1.516800 |
| 21. | −36.7913    | 1.7000  | 37.20 | 1.834000 |
| 22. | 76.5301     | (D22)   |       | 1.000000 |
| 23. | 64.1464     | 3.5000  | 31.08 | 1.688930 |
| 24. | 60.2669     | 1.6000  | 49.45 | 1.772789 |
| 25. | 41.1154     | (D25)   |       | 1.000000 |
| 26. | −72.7090    | 1.6000  | 35.72 | 1.902650 |
| 27. | 138.0658    | 7.2000  | 82.52 | 1.497820 |
| 28. | −29.4373    | 0.1000  |       | 1.000000 |
| 29. | 635.7329    | 3.6000  | 70.41 | 1.487490 |
| 30. | −113.0656   | 0.1500  |       | 1.000000 |
| 31. | 85.7827     | 3.5000  | 70.41 | 1.487490 |
| 32. | −699.2121   | 0.1000  |       | 1.000000 |
| 33. | 37.0755     | 8.0000  | 70.41 | 1.487490 |
| 34. | −81.4294    | 2.0000  | 45.37 | 1.796681 |
| 35. | −467.4342   | (D35)   |       | 1.000000 |
| 36. | 258821.3600 | 1.7000  | 43.35 | 1.840421 |
| 37. | 37.9977     | 3.5000  | 36.98 | 1.612930 |
| 38. | 84.3733     | 6.9662  |       | 1.000000 |
| 39. | −43.8525    | 1.7000  | 43.35 | 1.840421 |
| 40. | 1017.9812   | 6.4000  | 36.98 | 1.612930 |

TABLE 5-continued

| 41. | −39.6982 | (Bf) | 1.000000 |

Aspherical Surface Data for Embodiment 5
Surface #8

| κ = 0.0000         | C6 = −0.41064E-08 |
| C3 = 0.31026E-06   | C7 = 0.76692E-10  |
| C4 = 0.49580E-05   | C8 = 0.85161E-11  |
| C5 = −0.29651E-07  | C10 = 0.48019E-14 |

Variable Surface Separation Data for Embodiment 5

| f   | 29.00000  | 50.00000  | 150.00000 | 294.00000 |
|-----|-----------|-----------|-----------|-----------|
| D0  | 0.00000   | 0.00000   | 0.00000   | 0.00000   |
| D7  | 1.00494   | 24.02269  | 76.34830  | 95.33853  |
| D16 | 32.14688  | 15.40670  | 2.89593   | 1.51909   |
| D22 | 1.40816   | 5.59320   | 7.61291   | 17.33462  |
| D25 | 19.74295  | 15.55791  | 13.53820  | 3.81650   |
| D35 | 5.48020   | 8.94567   | 7.40119   | 0.99911   |
| Bf  | 38.02178  | 49.20398  | 78.64763  | 101.30824 |
| β   | −0.03333  | −0.03333  | −0.03333  | −0.03333  |
| D0  | 808.22120 | 1396.35370| 4112.62080| 8005.50760|
| D7  | 1.00494   | 24.02269  | 76.34830  | 95.33853  |
| D16 | 33.27557  | 16.20625  | 4.10649   | 3.39935   |
| D22 | 0.27947   | 4.79365   | 6.40235   | 15.45436  |
| D25 | 19.74295  | 15.55791  | 13.53820  | 3.81650   |
| D35 | 5.48020   | 8.94567   | 7.40119   | 0.99911   |
| Bf  | 38.02178  | 49.20398  | 78.64763  | 101.30824 |

TABLE 6

Embodiment 6
f = 29–294
FNo = 3.59–5.90
2ω = 76.14°–8.18°

|     | r          | d      | υ(d)  | n(d)     |
|-----|------------|--------|-------|----------|
| 1.  | 136.1380   | 2.5000 | 37.20 | 1.834000 |
| 2.  | 79.2745    | 9.2000 | 82.52 | 1.497820 |
| 3.  | 738.5144   | 0.1500 |       | 1.000000 |
| 4.  | 87.4761    | 7.8000 | 82.52 | 1.497820 |
| 5.  | 1222.3469  | (D5)   |       | 1.000000 |
| *6. | 99.0420    | 1.8000 | 43.35 | 1.840421 |
| 7.  | 22.2295    | 7.5000 |       | 1.000000 |
| 8.  | −66.1104   | 1.5000 | 43.35 | 1.840421 |
| 9.  | 44.8515    | 2.6157 |       | 1.000000 |
| 10. | 40.7326    | 6.0000 | 27.83 | 1.699110 |
| 11. | −45.4841   | 2.0000 |       | 1.000000 |
| 12. | −24.0961   | 1.5000 | 43.35 | 1.840421 |
| 13. | 167.8363   | 3.5000 | 29.46 | 1.717360 |
| 14. | −49.3957   | (D14)  |       | 1.000000 |
| 15. | ∞          | 2.0000 |       | 1.000000 (Aperture Stop S) |
| 16. | 241.7696   | 4.5000 | 70.41 | 1.487490 |
| 17. | −46.1320   | 0.1500 |       | 1.000000 |
| 18. | 36.2261    | 8.5000 | 70.41 | 1.487490 |
| 19. | −42.1086   | 1.7000 | 37.20 | 1.834000 |
| 20. | −1528.2908 | (D20)  |       | 1.000000 |
| 21. | −100.7868  | 5.0000 | 33.75 | 1.648311 |
| 22. | −31.1787   | 1.6000 | 65.42 | 1.603001 |
| 23. | 132.2303   | (D23)  |       | 1.000000 |
| 24. | 625.5176   | 1.8000 | 37.20 | 1.834000 |
| 25. | 44.5885    | 8.0000 | 69.98 | 1.518601 |
| 26. | −48.5517   | 0.1000 |       | 1.000000 |
| 27. | 51.2229    | 6.8000 | 65.42 | 1.603001 |
| 28. | −85.4353   | 0.1000 |       | 1.000000 |
| 29. | 73.4277    | 6.0000 | 70.41 | 1.487490 |
| 30. | −61.6908   | 2.0000 | 37.20 | 1.834000 |
| 31. | −539.8333  | (D31)  |       | 1.000000 |
| 32. | −740.0834  | 5.5000 | 35.70 | 1.625882 |
| 33. | −33.3134   | 1.7000 | 45.37 | 1.796681 |
| 34. | 65.6734    | 6.0000 |       | 1.000000 |
| 35. | −39.5936   | 1.7000 | 40.90 | 1.796310 |
| 36. | −57.2371   | 4.0000 | 48.97 | 1.531721 |
| 37. | −32.7622   | (Bf)   |       | 1.000000 |

Aspherical Surface Data for Embodiment 6

TABLE 6-continued

Surface #6

| κ = 4.1235 | C6 = −0.16793E-08 |
|---|---|
| C3 = −0.2024E-06 | C7 = −0.16378E-09 |
| C4 = 0.23129E-05 | C8 = 0.35002E-11 |
| C5 = 0.15669E-06 | C10 = 0.26688E-13 |

Variable Surface Separation Data for Embodiment 6

| f | 29.00000 | 50.00000 | 150.00000 | 294.00000 |
|---|---|---|---|---|
| D0 | 0.00000 | 0.00000 | 0.00000 | 0.00000 |
| D5 | 0.82109 | 19.75324 | 69.18893 | 90.23184 |
| D14 | 30.85310 | 16.96953 | 1.55260 | 1.04952 |
| D20 | 8.57436 | 11.09865 | 9.55104 | 23.47615 |
| D23 | 16.25105 | 11.20248 | 10.39095 | 1.34926 |
| D31 | 2.98313 | 3.83166 | 5.81904 | 0.97352 |
| Bf | 46.36667 | 68.23671 | 107.01519 | 137.78702 |
| β | −0.03333 | −0.03333 | −0.03333 | −0.03333 |
| D0 | 817.34920 | 1414.68010 | 4207.15230 | 8230.91230 |
| D5 | 0.82109 | 19.75324 | 69.18893 | 90.23184 |
| D14 | 31.76194 | 17.59013 | 2.29742 | 2.07533 |
| D20 | 7.66552 | 10.47804 | 8.80622 | 22.45033 |
| D23 | 16.25105 | 11.20248 | 10.39095 | 1.34926 |
| D31 | 2.98313 | 3.83166 | 5.81904 | 0.97352 |
| Bf | 46.36667 | 68.23671 | 107.01519 | 137.78702 |
| β | 46.06687 | −0.07236 | −0.10162 | −0.13237 |
| D0 | 380.93490 | 605.69200 | 1183.26660 | 1631.91620 |
| D5 | 0.82109 | 19.75324 | 69.18893 | 90.23184 |
| D14 | 32.69352 | 18.31986 | 3.81870 | 5.12704 |
| D20 | 6.73393 | 9.74831 | 7.28494 | 19.39863 |
| D23 | 16.25105 | 11.20248 | 10.39095 | 1.34926 |
| D31 | 2.98313 | 3.83166 | 5.81904 | 0.97352 |
| Bf | 46.36667 | 68.23671 | 107.01519 | 137.78702 |

Table 7 shows conditional values of the various embodiments of the present invention.

TABLE 7

| Condition | Embodiment | | | | | |
|---|---|---|---|---|---|---|
| | 1 | 2 | 3 | 4 | 5 | 6 |
| (1) (DIT − DIW)/fW | 3.178 | 3.184 | 3.184 | 3.083 | 3.253 | 3.083 |
| (2) f1/\|f2\| | 7.751 | 7.751 | 7.751 | 7.751 | 7.210 | 7.751 |
| (3) f3/fT | 0.1756 | 0.1756 | 0.1756 | 0.1756 | 0.1756 | 0.1756 |
| (4) f4/fT | −0.3535 | −0.3535 | 0.3535 | −0.3535 | −0.3848 | −0.3535 |
| (5) f5/fT | 0.2166 | 0.2166 | 0.2166 | 0.2160 | 0.2160 | 0.2160 |
| (6) f6/fT | | | | −0.2254 | −0.2254 | −0.2254 |

FIGS. 2 through 5, 7 through 10, 12 through 15, 17 through 20, 22 through 25, and 27 through 30, show, for Embodiments 1 through 6, respectively, diagrams of various aberrations for an infinitely distant point, when the zoom lens is at the maximum wide-angle state, f=50 mm, f=150 mm, and the maximum telephoto state, respectively. In these drawings, FNO is the F-number, A is the half-field angle, and d and g are the d-line and g-line aberration curves. In the astigmatism diagrams, the solid lines show the sagittal image plane, and the dotted lines show the meridional image plane.

As can be seen from the aberration diagrams and the above data tables, in the zoom lenses of the various embodiments of the present invention, in spite of the fact that a large field angle (a full-field angle, 2ω, of 76.2°) and high-zoom ratio (over 10×) are realized, excellent correction for aberration is effected in the various focal length states.

Note that although an aspheric surface is provided in the second lens group G2 in each of the above embodiments, additional aspheric surfaces may also be provided in the third and/or fourth lens groups. Doing so would allow these lens groups to be used to correct for spherical aberration, upper side coma, etc. thus making it possible to construct zoom lenses having larger diameters, higher zoom ratio, and wider field angles.

Also, in the above embodiments, focusing is performed by moving the third lens group, and the aperture stop along with it. The movement of the aperture stop could, however, be performed independently, and focusing performed by moving only the lens portion of the third lens group (with the aperature stop's position fixed with respect to the image plane). There is a disadvantage to this in that it adds complexity to the mechanism, but there are significant advantages with respect to minimization of eclipses due to the movement of lenses in order to focus the wide-angle principal ray, and the reduction of minimum close-up focusing distance.

According to the apparatus incorporating the principles of the present invention, as described above, a zoom lens system with a high zoom ratio of over 10× can be realized.

Various modifications will become possible for those skilled in the art after receiving the teachings of the present disclosure without departing from the scope thereof.

What is claimed is:

1. A zoom lens system with high zoom ratio comprising, in order from the object side:

a first lens group having a positive refractive power;

a second lens group having a negative refractive power;

a third lens group having a positive refractive power;

a fourth lens group having a negative refractive power; and a fifth lens group having positive refractive power;

whereby said zoom lens system is operated from its maximum wide-angle state to its maximum telephoto state by moving said first lens group to increase the air-space separation between said first lens group and said second lens group; decreasing the air-space separation between said second lens group and said third lens group; increasing the air-space separation between said third lens group and said fourth lens group; and decreasing the air-space separation between said fourth lens group and said fifth lens group, such that the following condition (1) is satisfied:

$$2.3 < (D_{IT} - D_{IW})/fw < 10 \quad (1)$$

where $D_{IT}$ is the separation between said first lens group and said second lens group in said maximum telephoto state, $D_{IW}$ is the separation between said first lens group and said second lens group in said maximum wide-angle state, and fw is the focal length of the total zoom lens system in the maximum wide-angle state.

2. The zoom lens system, as claimed in claim 1, wherein the following condition (2) is also satisfied:

$$6 < f1/|f2| < 15 \quad (2)$$

where f1 is the focal length of said first lens group and f2 is the focal length of said second lens group.

3. The zoom lens system, as claimed in claim 2, wherein said second lens group moves toward said object side of said zoom lens system when said system is operated from the maximum wide-angle state to the maximum telephoto state.

4. The zoom lens system as claimed in claim 3, wherein said second lens group comprises, in order from the object side, a first lens subgroup of negative refractive power, a second lens subgroup of positive refractive power, and a third lens subgroup of negative refractive power, wherein at least one negative lens component within said second lens group that is positioned nearest said object side of said zoom lens system has at least one aspheric surface.

5. The zoom lens system, as claimed in claim 2, wherein said second lens group comprises, in order from the object side, a first lens subgroup of negative refractive power, a second lens subgroup of positive refractive power, and a third lens subgroup of negative refractive power, wherein at least one negative lens component within said second lens group that is positioned nearest the object side of said zoom lens system has at least one aspherical surface.

6. The zoom lens system, as claimed in claim 1, wherein said second lens group moves toward the object side of said zoom lens system when zooming from the maximum wide-angle state to the maximum telephoto state.

7. The zoom lens system, as claimed in claim 6, wherein said second lens group comprises, in order from the object side, a first lens subgroup of negative refractive power, a second lens subgroup of positive refractive power, and a third lens subgroup of negative refractive power, wherein at least one negative lens component within said second lens group that is positioned nearest the object side of said zoom lens system has at least one aspherical surface.

8. The zoom lens system, as claimed in claim 1, wherein the following condition (3) is also satisfied:

$$0.1 < f3/fT < 0.3 \tag{3}$$

where f3 is the focal length of said third lens group, and fT is the focal length of the total zoom lens system in the maximum telephoto state.

9. The zoom lens system, as claimed in claim 1, wherein the following condition (4) is also satisfied:

$$-0.6 < f4/fT < -0.2 \tag{4}$$

where f4 is the focal length of said fourth lens group, and fT is the focal length of the total zoom lens system in the maximum telephoto state.

10. The zoom lens system, as claimed in claim 1, wherein the following condition (5) is also satisfied:

$$0.05 < f5/fT < 0.7 \tag{5}$$

where f5 is the focal length of said fifth lens group, and fT is the focal length of the total zoom lens system in the maximum telephoto state.

11. The zoom lens system, as claimed in claim 1, wherein said second lens group comprises, in order from the object side, a first lens subgroup of negative refractive power, a second lens subgroup of positive refractive power, and a third lens subgroup of negative refractive power, wherein at least one negative lens component within said second lens group that is positioned nearest the object side of said zoom lens system has at least one aspherical surface.

12. The zoom lens system, as claimed in claim 1, wherein focusing, from infinity to close-up, is performed by moving said third lens group toward the image side of said zoom lens system.

13. The zoom lens system, as claimed in claim 12, wherein the following condition (3) is also satisfied:

$$0.1 < f3/fT < 0.3 \tag{3}$$

where f3 is the focal length of said third lens group, and fT is the focal length of the total zoom lens system in the maximum telephoto state.

14. The zoom lens system, as claimed in claim 1, wherein an aperture stop is placed between said second lens group and said fourth lens group.

15. The zoom lens system, as claimed in claim 14, wherein focusing, from infinity to close-up, is performed by moving said third lens group toward the image side of said zoom lens system.

16. A zoom lens system with high zoom ratio comprising, in order from the object side:

a first lens group having a positive refractive power;

a second lens group having a negative refractive power;

a third lens group having a positive refractive power;

a fourth lens group having a negative refractive power; and a fifth lens group having positive refractive power;

whereby said zoom lens system is operated from its maximum wide-angle state to its maximum telephoto state by increasing the air-space separation between said first lens group and said second lens group; decreasing the air-space separation between said second lens group and said third lens group; increasing the air-space separation between said third lens group and said fourth lens group; and decreasing the air-space separation between said fourth lens group and said fifth lens group, such that the Following condition (1) is satisfied:

$$2.3 < (D_{IT} - D_{IW})/fw < 10 \tag{1}$$

where $D_{IT}$ is the separation between said first lens group and said second lens group in said maximum telephoto state, $D_{IW}$ is the separation between said first lens group and said second lens group in said maximum wide-angle state, and fw is the focal length of the total zoom lens system in the maximum wide-angle state and wherein a negative sixth lens group is arranged between said fifth lens group and the image side of said zoom lens system; and wherein zooming from the maximum wide-angle state of said zoom lens system toward the maximum telephoto state thereof is performed by decreasing the air-space separation between said fifth lens group and said sixth lens group.

17. The zoom lens system, as claimed in claim 16, wherein the following condition (6) is also satisfied:

$$-0.7 < f6/fT < -0.05 \tag{6}$$

where f6 is the focal length of said sixth lens group, and fT is the focal length of the total zoom lens system in the maximum telephoto state.

18. The zoom lens system, as claimed in claim 16, wherein said zoom lens system satisfies the following condition (2):

$$6 < f1/|f2| < 15 \tag{2}$$

where f1 is the focal length of said first lens group and f2 is the focal length of said second lens group.

19. The zoom lens system, as claimed in claim 18, wherein said second lens group moves toward the object side of said zoom lens system when zooming from the maximum wide-angle state to the maximum telephoto state.

20. The zoom lens system, as claimed in claim 19, wherein said second lens group comprises, in order from the object end, a first lens subgroup of negative refractive power, a second lens subgroup of positive refractive power, and a third lens subgroup of negative refractive power,
wherein at least one negative lens component within said second lens group that is positioned nearest the object side of said zoom lens system has at least one aspherical surface.

21. The zoom lens system, as claimed in claim 18, wherein said second lens group comprises, in order from the object side, a first lens subgroup of negative refractive power, a second lens subgroup of positive refractive power, and a third lens subgroup of negative refractive power,
wherein at least one negative lens component within said second lens group that is positioned nearest the object side of said zoom lens system has at least one aspherical surface.

22. The zoom lens system, as claimed in claim 16, wherein said second lens group moves toward the object side of said zoom lens system when zooming from the maximum wide-angle state to the maximum telephoto state.

23. The zoom lens system, as claimed in claim 22, wherein said second lens group comprises, in order from the object side, a first lens subgroup of negative refractive power, a second lens subgroup of positive refractive power, and a third lens subgroup of negative refractive power, and comprises at least a negative lens component,
wherein at least one of said negative lens component within said second lens group that is positioned nearest the object side of said zoom lens system has at least one aspherical surface.

24. The zoom lens system, as claimed in claim 16, wherein said second lens group comprises, in order from the object side, a first lens subgroup of negative refractive power, a second lens subgroup of positive refractive power, and a third lens subgroup of negative refractive power, and comprises at least a negative lens component,
wherein at least one of said negative lens component within said second lens group that is positioned nearest the object side of said zoom lens system has at least one aspherical surface.

25. The zoom lens system, as claimed in claim 16, wherein said third lens group moves toward the image side of said zoom lens system when zooming from the maximum wide-angle state to the maximum telephoto state.

26. The zoom lens system, as claimed in claim 25, wherein the following condition (3) is satisfied:

$$0.1 < f3/fT < 0.3 \quad (3)$$

where f3 is the focal length of said third lens group, and fT is the focal length of the total zoom lens system in the maximum telephoto state.

27. The zoom lens system, as claimed in claim 16, wherein an aperture stop is placed between said second lens group and said fourth lens group.

28. The zoom lens system, as claimed in claim 27, wherein focusing, from infinity to close-up, is performed by moving said third lens group toward the image side of said zoom lens system.

29. The zoom lens system, as claimed in claim 16, wherein the following condition (3) is also satisfied:

$$0.1 < f3/fT < 0.3 \quad (3)$$

where f3 is the focal length of said third lens group, and fT is the focal length of the total zoom lens system in the maximum telephoto state.

30. The zoom lens system, as claimed in claim 16, wherein the following condition (4) is also satisfied:

$$-0.6 < f4/fT < -0.2 \quad (4)$$

where f4 is the focal length of said fourth lens group, and fT is the focal length of the total zoom lens system in the maximum telephoto state.

31. The zoom lens system, as claimed in claim 16, wherein the following condition (5) is also satisfied:

$$0.05 < f5/fT < 0.7 \quad (5)$$

where f5 is the focal length of said fifth lens group, and fT is the focal length of the total zoom lens system in the maximum telephoto state.

32. A zoom lens system with a high zoom ratio comprising:
a first lens group having a positive refractive power;
a second lens group, positioned between an image of the system and the first lens group, having a negative refractive power;
a third lens group, positioned between the image and the second lens group, having positive refractive power;
a fourth lens group, positioned between the image and the third lens group, having negative refractive power; and
a fifth lens group, positioned between the image and the fourth lens group, having positive refractive power;
wherein, when zooming from maximum wide-angle state to maximum telephoto state, an air-space separation between said first lens group and the second lens group increases, an air-space separation between said second lens group and the third lens group decreases, an air-space separation between the third lens group and the fourth lens group increases, and an air-space separation between the fourth lens group and the fifth lens group decreases,
and wherein said system satisfies the following conditions:

$$2.3 < (D_{IT} - D_{IW})/fw < 10$$

$$6 < f1/|f2| < 15$$

where $D_{IT}$ is the separation between said first lens group and said second lens group in said maximum telephoto state, $D_{IW}$ is the separation between said first lens group and said second lens group in said maximum wide-angle state, fw is the focal length of the total zoom lens system in the maximum wide-angle state, f1 is the focal length of said first lens group, and f2 is the focal length of said second lens group.

33. A zoom lens system with a high zoom ratio comprising:
a first lens group having a positive refractive power;
a second lens group, positioned between an image of the system and the first lens group, having a negative refractive power;
a third lens group, positioned between the image and the second lens group, having positive refractive power;
a fourth lens group, positioned between the image and the third lens group, having negative refractive power; and a fifth lens group, positioned between the image and the fourth lens group, having positive refractive power;

wherein, when zooming from maximum wide-angle state to maximum telephoto state, an air-space separation between said first lens group and the second lens group increases, an air-space separation between said second lens group and the third lens group decreases, an air-space separation between the third lens group and the fourth lens group increases, and an air-space separation between the fourth lens group and the fifth lens group decreases, and said second lens group moves toward said object side of said system, and wherein said system satisfies the following conditions:

$$2.3 < (D_{IT} - D_{IW})/fw < 10$$

where $D_{IT}$ is the separation between said first lens group and said second lens group in said maximum telephoto state, $D_{IW}$ is the separation between said first lens group and said second lens group in said maximum wide-angle state, fw is the focal length of the total zoom lens system in the maximum wide-angle state.

* * * * *

UNITED STATES PATENT AND TRADEMARK OFFICE
CERTIFICATE OF CORRECTION

PATENT NO. : 5,956,184
DATED : September 21, 1999
INVENTOR(S) : SATO

It is certified that error appears in the above-identified patent and that said Letters Patent is hereby corrected as shown below:

On the title page item [30], Priority: Japanese 09-237497 - September 2, 1997

Signed and Sealed this

Twenty-third Day of May, 2000

*Attest:*

Q. TODD DICKINSON

*Attesting Officer*   *Director of Patents and Trademarks*